(12) United States Patent
Tochio

(10) Patent No.: US 8,174,963 B2
(45) Date of Patent: May 8, 2012

(54) DATA RELAY APPARATUS AND FAILURE RECOVERY METHOD

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 583 days.

(21) Appl. No.: 11/210,694

(22) Filed: Aug. 25, 2005

(65) Prior Publication Data

US 2006/0215546 A1 Sep. 28, 2006

(30) Foreign Application Priority Data

Mar. 28, 2005 (JP) ................................. 2005-092379

(51) Int. Cl.
*H04L 12/26* (2006.01)

(52) U.S. Cl. ........................................ 370/217; 370/222

(58) Field of Classification Search .................. 370/254, 370/352, 401, 351, 256, 252, 400, 216, 222, 370/227, 16, 258, 218, 452; 713/201; 714/717; 359/119; 709/251

See application file for complete search history.

(56) References Cited

U.S. PATENT DOCUMENTS

| | | | | |
|---|---|---|---|---|
| 5,440,540 A | * | 8/1995 | Kremer | 370/223 |
| 6,226,111 B1 | * | 5/2001 | Chang et al. | 398/9 |
| 6,598,092 B2 | * | 7/2003 | Tomizawa et al. | 709/251 |
| 6,766,482 B1 | * | 7/2004 | Yip et al. | 714/717 |
| 7,154,861 B1 | * | 12/2006 | Merchant et al. | 370/254 |
| 7,307,947 B2 | * | 12/2007 | Okuno | 370/222 |
| 7,388,828 B2 | * | 6/2008 | Nakash | 370/218 |
| 2002/0172150 A1 | * | 11/2002 | Kano | 370/216 |
| 2003/0165119 A1 | * | 9/2003 | Hsu et al. | 370/258 |
| 2003/0223379 A1 | * | 12/2003 | Yang et al. | 370/256 |
| 2003/0233579 A1 | * | 12/2003 | Kimura et al. | 713/201 |
| 2004/0179472 A1 | * | 9/2004 | Khalilzadeh et al. | 370/227 |
| 2005/0207348 A1 | | 9/2005 | Tsurumi et al. | |
| 2005/0226265 A1 | * | 10/2005 | Takatori | 370/452 |
| 2006/0109802 A1 | * | 5/2006 | Zelig et al. | 370/258 |

FOREIGN PATENT DOCUMENTS

| | | |
|---|---|---|
| JP | H10-243016 | 9/1998 |
| JP | 2002-330146 | 11/2002 |
| JP | 2003-46522 A | 2/2003 |
| JP | 2003-258822 | 12/2003 |
| JP | 2004-076593 | 3/2004 |
| JP | 11-027724 | 5/2010 |
| JP | H11-017724 | 5/2010 |

(Continued)

OTHER PUBLICATIONS

Hhah, S. and Yip, M. "Extreme Networks' Ethernet Automatic Protection Switching (EAPS) Version 1," Extreme Networks, Oct. 2003, <URL: http://www.ietf.org/rfc/rfc3619.txt>, 6 pgs.

(Continued)

*Primary Examiner* — Kwang B Yao
*Assistant Examiner* — Syed M Bokhari
(74) *Attorney, Agent, or Firm* — Fujitsu Patent Center

(57) ABSTRACT

A data relay apparatus that recovers a failure in a network that shares a part of a plurality of rings and avoids occurrence of a loop path by providing a block in each of the rings includes a failure-notification-packet transmitting unit that transmits, when a failure is detected in a shared portion of a ring, a failure notification packet to a predetermined redundancy-providing ring; and a block setting unit that sets a block that blocks a main signal by passing through a control packet at a port where the failure is detected.

18 Claims, 16 Drawing Sheets

FOREIGN PATENT DOCUMENTS

WO　　WO 2004/095779 A1　　11/2004
WO　PCT/JP2005/000143　　　1/2005

OTHER PUBLICATIONS

"Enterprise Solution Guide", Solutions, Extreme Networks © 2003, <URL: http://www.extremenetworks.co.jp/solutions/enterprise_solution/solution_guide/index.htm>,3 pgs.

Japanese Office Action dated Aug. 3, 2010 for Japanese Application No. 2005-092379. A partial English-language translation is provided.

Japanese Office Action mailed May 18, 2010 for Japanese Application No. 2005-092379. A partial English-language translation is provided.

* cited by examiner

DATA RELAY APPARATUS AND FAILURE RECOVERY METHOD

BACKGROUND OF THE INVENTION

1. Field of the Invention

The present invention relates to a technology for recovering a failure in a network that shares a part of a plurality of rings and avoids occurrence of a loop path by providing a block in each of the rings.

2. Description of the Related Art

Recently, a network based on layer 2 using Ethernet (TM) is often used for building a large scale network such as a wide area network. The network using Ethernet (TM) has such advantages that its introduction cost is comparatively low but high-speed communication can be achieved.

When a large scale network is built using Ethernet (TM), how to ensure redundancy is a significant matter. Because Ethernet (TM) has been developed specifically for a small scale network such as a local area network (LAN) and has therefore no redundancy that is required for the large scale network.

One of technologies of providing redundancy to the network based on Ethernet (TM) is Ethernet (TM) Automatic Protection Switching (EAPS). This is a technology specific to a loop topology, and high-speed failure recovery is thereby achieved. EAPS selects one of data relay apparatuses, as a master, connected to one another in a ring shape (a data relay apparatus other than "master" is called "transit"), and suppresses occurrence of a loop of packets by blocking one port by the master. The network is restored by releasing the port upon occurrence of a failure (see S. Shah, M. Yip, "Extreme Networks' Ethernet (TM) Automatic Protection Switching (EAPS) Version 1", [online], October 2003, retrieved from the Internet:
<URL:http://www.ietf.org/rfc/rfc3619.txt>).

Japanese Patent Application 2004-076593 discloses a technology of improving EAPS. This technology is used when a failure occurs, and it is used so as to prevent occurrence of communication interruption upon failure recovery by re-selecting a data relay apparatus, as a master, provided adjacent to a location where the failure occurs. PCT/JP2005/000143 discloses a technology of efficiently performing the process of re-selecting a master in Japanese Patent Application 2004-076593.

In EAPS version 2 (EAPS v2) that is extended specifications of EAPS, redundancy in a multi-ring structure is also ensured. When a plurality of loop-type networks are caused to have a shared portion to form a multi-ring structure, so-called a super loop may be formed if a failure occurs in the shared portion, and a loop of packets may stop the network.

To solve the problems, in EAPS v2, a role as a controller or as a partner is given to the data relay apparatus in a shared portion. If a failure occurs in the shared portion, then the controller keeps only one of ports on the opposite side to a location where the failure occurs, and suppresses formation of the super loop by blocking other ports (see "Solution Guide", [online], retrieved from the Internet:
<URL:http://www.extremenetworks.co.jp/solutions/enterprise_solution/solution_guide/index.htm>).

In the system of EAPS v2, however, it is necessary to control data relay apparatuses by using their roles that includes four types in total obtained by adding roles of a controller and a partner to the master and the transit. Therefore, the load for the control increases. Furthermore, a position of the block largely changes when the failure occurs and the failure is recovered, which causes communication interruption to occur over the whole network.

SUMMARY OF THE INVENTION

It is an object of the present invention to at least solve the problems in the conventional technology.

A data relay apparatus according to one aspect of the present invention, which recovers a failure in a network that shares a part of a plurality of rings and avoids occurrence of a loop path by providing a block in each of the rings, includes a failure-notification-packet transmitting unit that transmits, when a failure is detected in a shared portion of a ring, a failure notification packet to a predetermined redundancy-providing ring; and a block setting unit that sets a block that blocks a main signal by passing through a control packet at a port where the failure is detected.

A failure recovery method according to another aspect of the present invention, which is for a data relay apparatus that recovers a failure in a network that shares a part of a plurality of rings and avoids occurrence of a loop path by providing a block in each of the rings, includes transmitting, when a failure is detected in a shared portion of a ring, a failure notification packet to a predetermined redundancy-providing ring; and setting a block that blocks a main signal by passing through a control packet at a port where the failure is detected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a data relay apparatus and a failure recovery method according to the present invention are explained in detail below with reference to the accompanying drawings.

Figure 16:
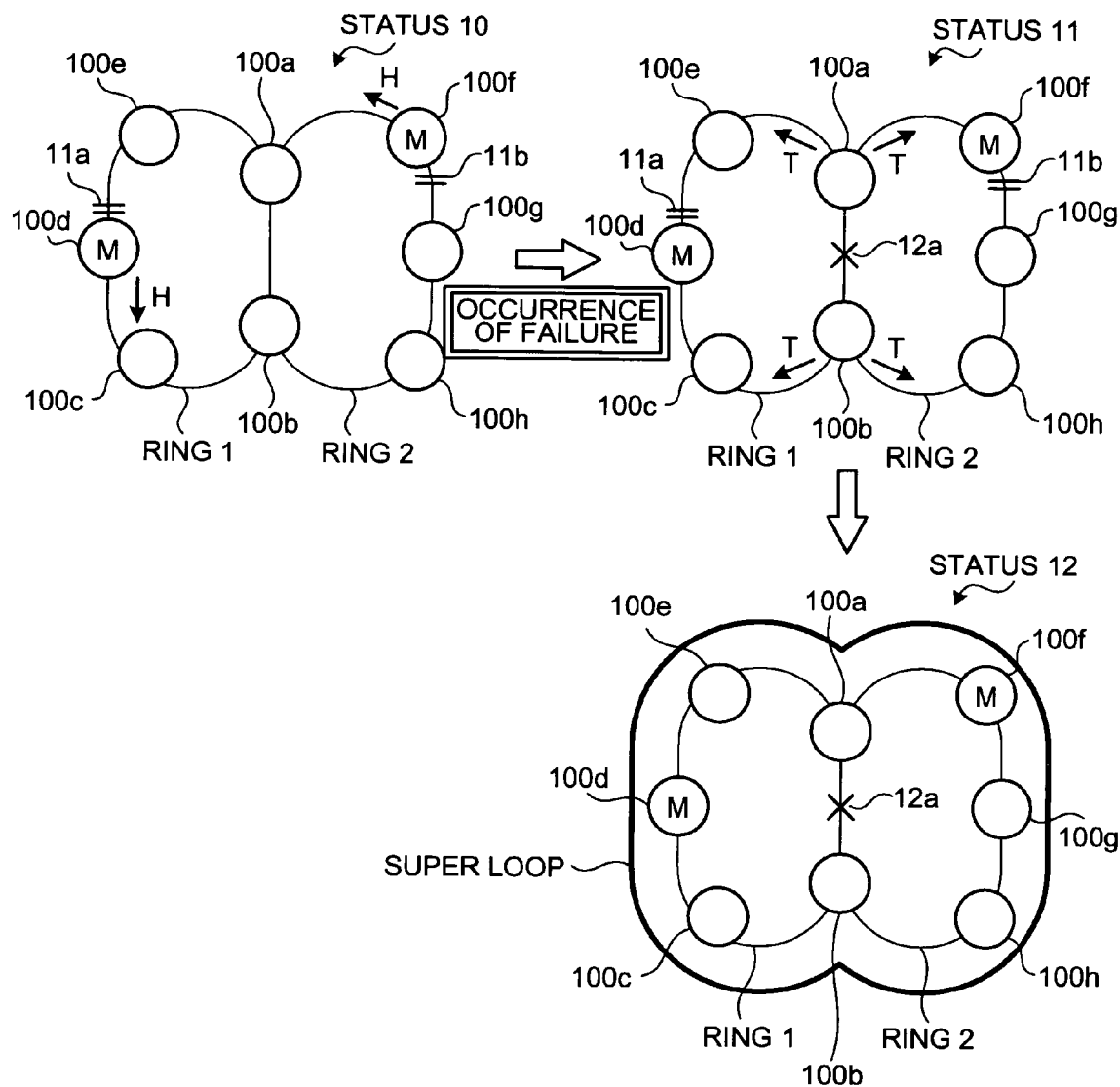
FIG. 16 is a schematic for explaining some problems when a failure occurs in a shared portion of a ring.

Some problems occurring when a failure occurs in a shared portion of a multi-ring network are explained below. FIG. 16 is a schematic for explaining some problems when a failure occurs in a shared portion of a ring.

The network shown in FIG. 16 has a multi-ring structure that shares a portion between a data relay apparatus 100a and a data relay apparatus 100b based on a ring 1 that includes the data relay apparatuses 100a and 100b and data relay apparatuses 100c, 100d, and 100e; and a ring 2 that includes the data relay apparatuses 100a and 100b and data relay apparatuses 100f, 100g, and 100h.

In normal operation, the data relay apparatus 100d that is a master (M) of the ring 1 sets a block 11a in a port thereof on the side of the data relay apparatus 100e, and causes a health (H) packet to go around from a port on the opposite side to verify the connectivity of the ring. Likewise, the data relay apparatus 100f that is a master of the ring 2 sets a block 11b in a port thereof on the side of the data relay apparatus 100g, and causes a health packet to go around from a port on the opposite site to verify the connectivity of the ring (status 10).

Assume that a failure 12a occurs in a portion between the data relay apparatuses 100a and 100b that is a shared portion. The data relay apparatuses 100a and 100b detect the failure 12a to send "trap" packets (T) for notification of occurrence of the failure to both the ring 1 and the ring 2 (status 11). The data relay apparatuses 100d and 100f that are the masters receive the trap packets to release the block 11a and the block 11b respectively in order to recover the failure. As a result, a loop covering the ring 1 and ring 2, a so-called super loop is formed (status 12).

Formation of the super loop causes packets of user data that are broadcast to be increased and a bandwidth to be thereby compressed, and the network to be finally down. This problem occurs not only in the network based on EAPS but also in a network based on the technology according to Patent Literature 1 and a network based on the technology according to Patent Literature 2.

Figure 17:
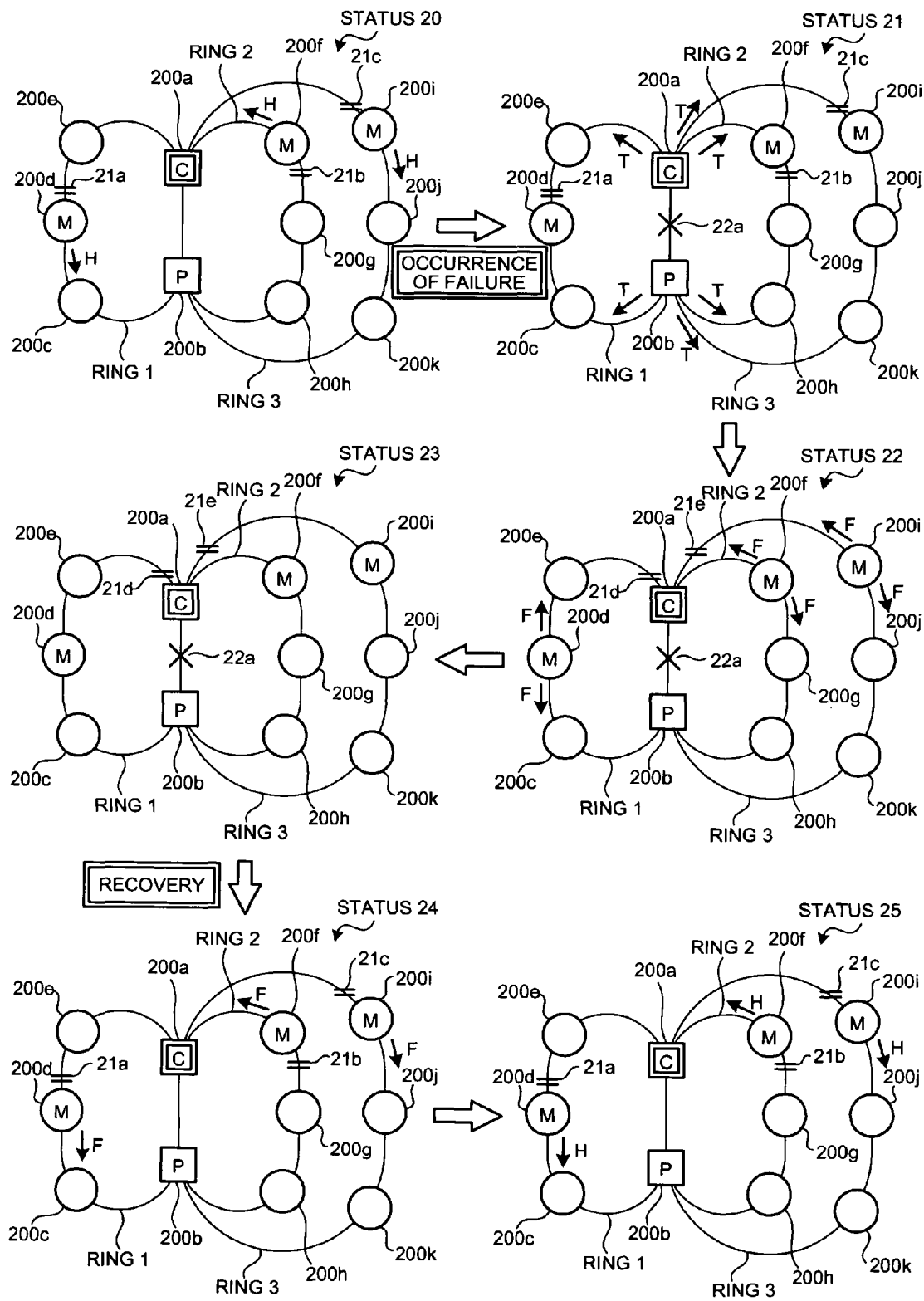
FIG. 17 is a schematic for explaining an overview of a conventional failure recovery method.

A conventional failure recovery method (specifically, a method of EAPS v2) for preventing formation of the super loop is explained below. FIG. 17 is a schematic for explaining an overview of the conventional failure recovery method.

The network shown in FIG. 17 has a multi-ring structure that shares a portion between a data relay apparatus 200a and a data relay apparatus 200b based on a ring 1 that includes the data relay apparatuses 200a and 200b and data relay apparatuses 200c, 200d, and 200e; a ring 2 that includes the data relay apparatuses 200a and 200b and data relay apparatuses 200f, 200g, and 200h; and a ring 3 that includes the data relay apparatuses 200a and 200b and data relay apparatuses 200i, 200j, and 200k.

A role as a controller (C) is allocated to the data relay apparatus 200a in the shared portion, and a role as a partner (P) is allocated to the other data relay apparatus 200b in the shared portion. When a failure occurs in the shared portion, the controller takes measures to prevent formation of the super loop.

In normal operation, the data relay apparatus 200d that is a master of the ring 1 sets a block 21a in a port thereof on the side of the data relay apparatus 200e, and causes a health packet to go around from a port on the opposite side to verify the connectivity of the ring. Likewise, the data relay apparatus 200f that is a master of the ring 2 sets a block 21b in a port thereof on the side of the data relay apparatus 200g, and causes a health packet to go around from a port on the opposite site side to verify the connectivity of the ring. Likewise, the data relay apparatus 200i that is a master of the ring 3 sets a block 21c in a port thereof on the side of the data relay apparatus 200a, and causes a health packet to go around from a port on the opposite side to verify the connectivity of the ring (status 20).

Assume that a failure 22a occurs in a portion between the data relay apparatuses 200a and 200b that is the shared portion. The data relay apparatuses 200a and 200b detect the failure 22a to send trap packets for notification of occurrence of the failure to the ring 1, the ring 2, and the ring 3 (status 21).

The data relay apparatus 200a that is the controller releases ports on the side where the failure is detected except one port on the opposite side thereto after transmission of the trap packets. In this example, the port connected to the ring 2 is left as it is, a block 21d is set in a port connected to the ring 1, and a block 21e is set in a port connected to the ring 3.

When receiving the trap packets, the data relay apparatus 200d, the data relay apparatus 200f, and the data relay apparatus 200i that are the masters release the block 21a, the block 21b, and the block 21c, respectively, to recover the failure. The release of these blocks causes a communication path to be changed. Therefore, the data relay apparatus 200d, the data relay apparatus 200f, and the data relay apparatus 200i transmit "flush" packets (F) to the data relay apparatuses in the respective rings, instructing them to flush address information learned.

Even if the data relay apparatus 200d, the data relay apparatus 200f, and the data relay apparatus 200i release the block 21a to the block 21c in the above manner, the super loop is prevented from its formation because the data relay apparatus 200a sets the block 21d and the block 21e. Furthermore, the data relay apparatus 200a does not set a block in the ring 2. Therefore, the ring 2 can be used as an alternative to the portion between the data relay apparatuses 200a and 200b where the failure occurs (status 23).

When the failure is recovered, the data relay apparatus 200a releases the block 21d and the block 21e, and the data relay apparatus 200d, the data relay apparatus 200f, and the data relay apparatus 200i re-set the block 21a, the block 21b, and the block 21c, respectively. By releasing and re-setting these blocks, the communication path is changed. Therefore, the data relay apparatus 200d, the data relay apparatus 200f, and the data relay apparatus 200i also transmit the flush packets to the data relay apparatuses, instructing them to flush the address information learned (status 24).

Thereafter, the data relay apparatus 200d, the data relay apparatus 200f, and the data relay apparatus 200i restart transmission of the health packets, and then the network returns to the normal status (status 25).

Even in the conventional failure recovery method, it is also possible to prevent formation of the super loop when the failure occurs in the shared portion. In this method, however, it is necessary to allocate the four roles such as the master, the transit, the controller, and the partner to the data relay apparatuses that form the network, respectively, which causes the load for control of these roles to increase. Furthermore, all the data relay apparatuses re-learn the address information in the scene of status 22 and the scene of status 24, which causes the communication interruption over the network to occur twice.

Figure 1:
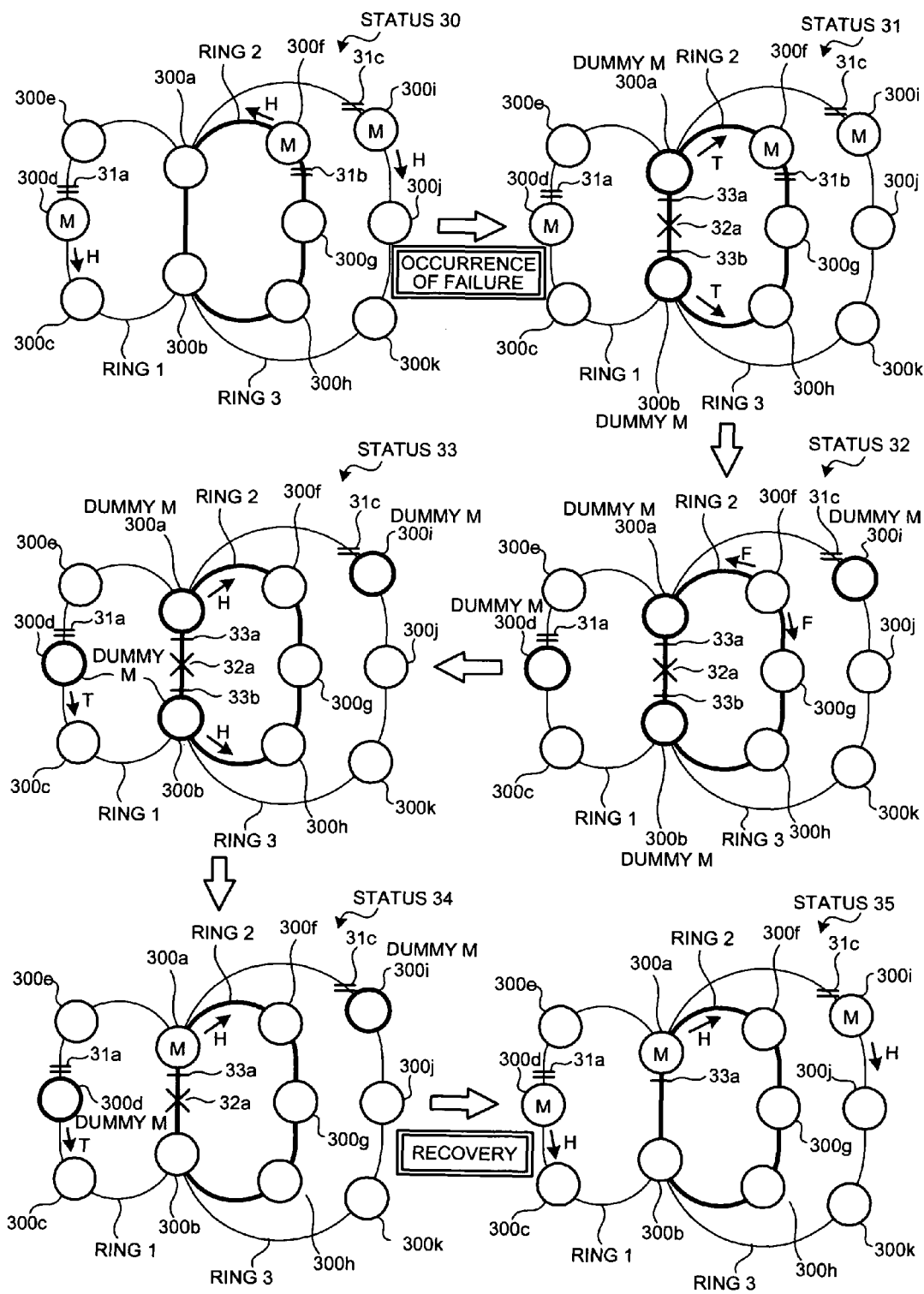
FIG. 1 is a schematic for explaining an overview of a failure recovery method according to the present invention.

The failure recovery method according to the present invention is explained below. FIG. 1 is a schematic for explaining an overview of the failure recovery method according to the present invention.

The network shown in FIG. 1 has a multi-ring structure that shares a portion between a data relay apparatus 300a and a data relay apparatus 300b based on a ring 1 that includes the data relay apparatuses 300a and 300b and data relay apparatuses 300c, 300d, and 300e; a ring 2 that includes the data relay apparatuses 300a and 300b and data relay apparatuses 300f, 300g, and 300h; and a ring 3 that includes the data relay apparatuses 300a and 300b and data relay apparatuses 300i, 300j, and 300k.

The data relay apparatus 300a and the data relay apparatus 300b situated in a shared portion are data relay apparatuses that execute the failure recovery method according to the present invention. The other data relay apparatuses are ones that perform failure recovery based on the technology of Patent Literature 2. The failure recovery method according to the present invention can also be executed based on the technology of Patent Literature 1 or based on the technology of Patent Literature 2, but here, the failure recovery method according to the present invention based on the technology of Patent Literature 2 is explained below.

In the failure recovery method according to the present invention, one of rings that share a shared portion is selected, and this ring selected is handled as a primary ring. The primary ring provides redundancy when a failure occurs in the shared portion. In this example, the ring 2 is selected as the primary ring. Initial selection of the primary ring may be performed by an administrator, or a data relay apparatus in the shared portion may perform the initial selection autonomously.

In normal operation, the data relay apparatus 300d that is a master of the ring 1 sets a block 31a in a port thereof on the side of the data relay apparatus 300e, and causes a health packet to go around from a port on the opposite side to verify the connectivity of the ring. Likewise, the data relay apparatus 300f that is a master of the ring 2 sets a block 31b in a port thereof on the side of the data relay apparatus 300g, and causes a health packet to go around from a port on the opposite side to verify the connectivity of the ring. Likewise, the data relay apparatus 300i that is a master of the ring 3 sets a block 31c in a port thereof on the side of the data relay apparatus 300a, and causes a health packet to go around from a port on the opposite side to verify the connectivity of the ring (status 30).

Assume that a failure 32a occurs in a portion between the data relay apparatus 300a and the data relay apparatus 300b that is a shared portion. The data relay apparatus 300a detects the failure 32a, and determines whether the failure 32a occurs in the shared portion. If it is determined that it occurs in the shared portion, the data relay apparatus 300a sets a block 33a in a port thereof on the shared portion side and sends a trap packet only from a port, out of ports on the opposite side to the shared portion, connected to the ring 2 that is the primary ring. Likewise, the data relay apparatus 300b sets a block 33b in a port thereof on the shared portion side and sends a trap packet only from a port, out of ports on the opposite side to the shared portion, connected to the ring 2. The block 33a and the block 33b block a user data packet but allow a control packet such as a health packet to pass through the ports.

The data relay apparatus 300a and the data relay apparatus 300b move to dummy masters after transmission of the trap packets. The movement of a data relay apparatus that detects a failure to the dummy master after the transmission of the trap packet thereby is normal operation when the failure recovery is performed based on the technology of Patent Literature 2.

When receiving the trap packet, the data relay apparatus 300f that is a master of the ring 2 releases the block 31b to recover the failure, and then moves to the transit. The movement of the master that receives the trap packet to the transit is normal operation when the failure recovery is performed based on the technology of Patent Literature 2.

The release of the block 31b causes a communication path to be changed. Therefore, the data relay apparatus 200f transmits flush packets to the data relay apparatuses in the ring, instructing them to flush address information learned. The transmission of the flush packets may be performed by the data relay apparatus 300a and the data relay apparatus 300b that have moved to the dummy masters.

Referring to the ring 1 and the ring 3, the health packets are blocked by the failure 32a to be prevented from going around. Therefore, the data relay apparatus 300d that is the master of the ring 1 and the data relay apparatus 300i that is the master of the ring 3 move to dummy masters according to the transition defined by the technology of Patent Literature 2. The user data packet cannot pass through the portion between the data relay apparatus 300a and the data relay apparatus 300b, but goes by way of the ring 2 to keep their connectivity. Therefore, the communication paths in the ring 1 and the ring 3 are not actually changed, which allows transmission of the flush packets to be eliminated in the ring 1 and the ring 3 (status 32).

Thereafter, in order to decide which of the data relay apparatus 300a and the data relay apparatus 300b becomes the master, both of them transmit health packets to each other and compare their priorities with each other as described in Patent Literature 2 (status 33).

In this example, as a result of exchanging the health packets, the data relay apparatus 300a moves to the master, and the data relay apparatus 300b moves to the transit. In the overall network, because the block 31a is maintained in the ring 1 and the block 31b is maintained in the ring 3, the super loop is not formed. Moreover, the block 31b is released, and therefore, the ring 2 can be used as an alternative to the portion between the data relay apparatus 300a and the data relay apparatus 300b where the failure occurs (status 34).

When the failure is recovered, the health packets transmitted by the data relay apparatus 300d and the data relay apparatus 300i go around along the rings, and the data relay apparatus 300d and the data relay apparatus 300i return to the masters according to the transition defined by the technology of Patent Literature 2. Although the block 33a is present between the data relay apparatus 300a and the data relay apparatus 300b, the block 33a does not block the control packet but allows the control packet to pass through the port. The blocks do not move upon recovery, and therefore, there is no need to re-learn the address information (status 35).

In the failure recovery method according to the present invention, one of the rings having the shared portion is set as the primary ring. If a failure occurs in the shared portion, the process of recovery is performed only on the primary ring to prevent formation of the super loop. Moreover, there is no need to allocate the roles such as the controller and the partner to the data relay apparatuses in the shared portion to prevent formation of the super loop. The communication interruption due to re-learning of the address information occurs only once in the primary ring.

As is clear from the explanation, if the failure occurs in the shared portion, the data relay apparatus according to the present invention performs the process of recovery only on the primary ring, and performs basically the same operation as that of the failure recovery method of the Patent Literature 2 on any ring other than the primary ring. The status transition of the data relay apparatus according to the present invention is explained below.

Figure 2:
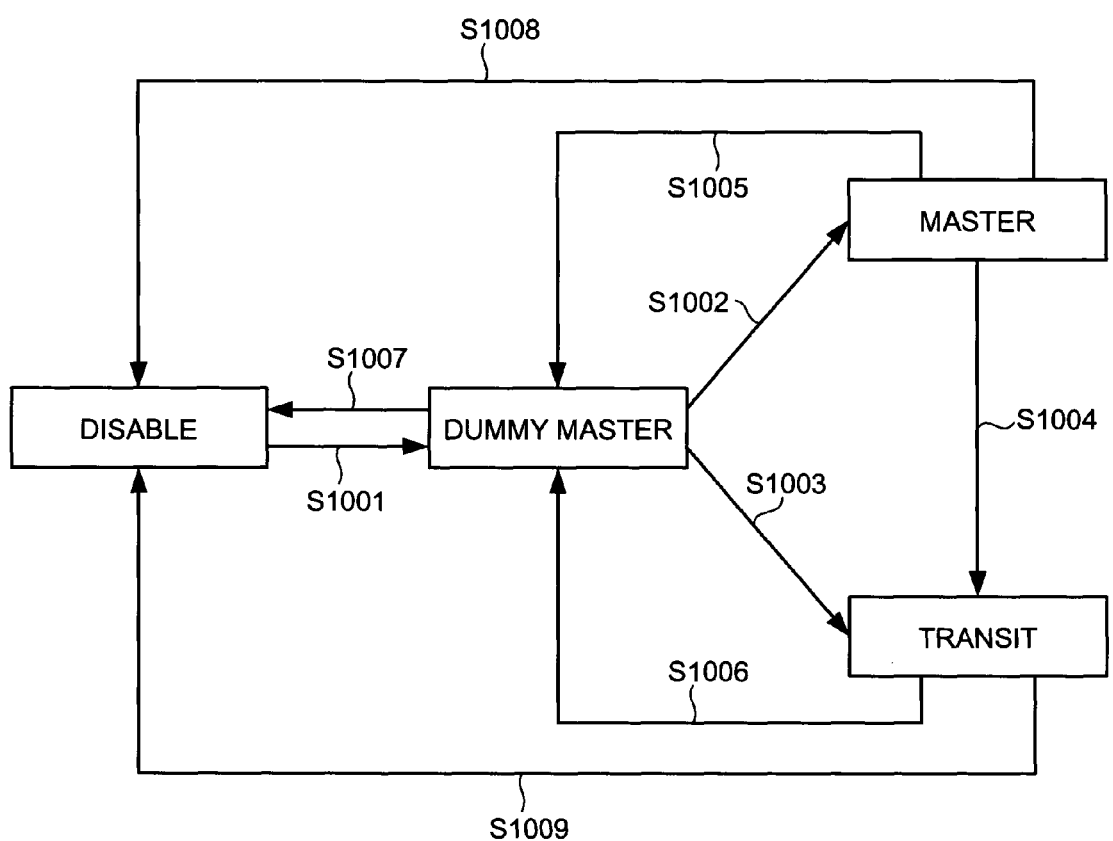
FIG. 2 is a schematic for illustrating a status transition of a data relay apparatus.

FIG. 2 is a schematic for illustrating a status transition of a data relay apparatus. The data relay apparatus according to the present embodiment moves to four statuses such as "disable", "dummy master", "master", and "transit". At first, ports on both sides of the data relay apparatus are active in its disable status which indicates a breakdown status, and if at least one of the ports is linked up, the data relay apparatus moves to the dummy master (step S1001).

If the data relay apparatus has moved to the dummy master and both of the ports are linked up, the data relay apparatus exchanges the health packets with another data relay apparatus. As a result, if the data relay apparatus has a higher priority than the another data relay apparatus, it moves to the master (step S1002). If the data relay apparatus has a lower priority than the another data relay apparatus, it moves to the transit (step S1003). The exchange of the health packets is also performed when the flush packet is received after one of the links is down. The movement from the dummy master to the transit also occurs when the health packet is received from another master after the data relay apparatus moves to the dummy master due to timeout of the health packet.

When the data relay apparatus moves to the master and receives a health packet, from another data relay apparatus, having a higher priority than that of the data relay apparatus or receives a trap packet therefrom, the data relay apparatus moves to the transit (step S1004). If one of the links is down or if a timeout of the health packet occurs, the data relay apparatus moves to the dummy master (step S1005).

When it moves to the transit, if one of the links is down, the data relay apparatus moves to the dummy master (step S1006). If the links on both sides are down even in any status of the dummy master, the master, and the transit, the data relay apparatus moves to the disable (step S1007, step S1008, step S1009).

Figure 3:
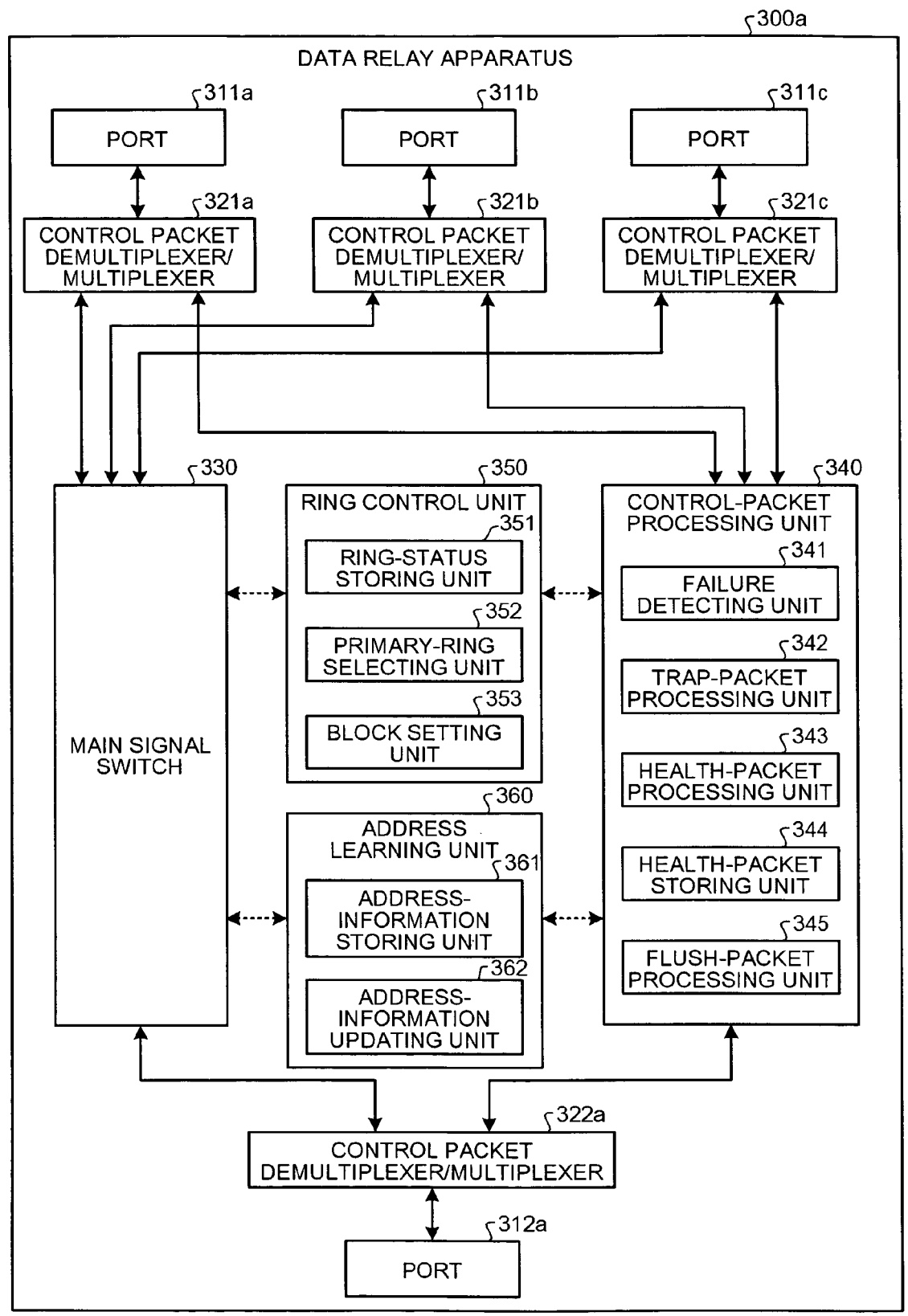
FIG. 3 is a block diagram of a configuration of the data relay apparatus shown in FIG. 1.

The configuration of the data relay apparatus according to the present embodiment is explained below. The data relay apparatus 300a and the data relay apparatus 300b shown in FIG. 1 have the same configuration as each other. Therefore, the data relay apparatus 300a is used as an example to be explained here. FIG. 3 is a block diagram of the configuration of the data relay apparatus 300a shown in FIG. 1.

The data relay apparatus 300a includes ports 311a to 311c, a port 312a, control packet demultiplexers/multiplexers 321a to 321c, a control packet demultiplexer/multiplexer 322a, a main signal switch 330, a control packet processor 340, a ring controller 350, and an address learning unit 360.

The ports 311a to 311c are input-output communication ports on a non-shared side. Three ports are provided on the non-shared side as an example, but any number of ports may be provided. The port 312a is an input-output communication port on a shared side.

The control packet demultiplexers/multiplexers 321a to 321c and the control packet demultiplexer/multiplexer 322a are processors that demultiplex packets received by the ports 311a to 311c and the port 312a into the main signal and control packets, and that transmit the former one to a main signal switch 330 and the latter ones to the control packet processor 340. The control packet demultiplexers/multiplexers 321a to 321c and the control packet demultiplexer/multiplexer 322a also multiplex the main signal output from the main signal switch 330 and the control packet output from the control packet processor 340 to be transmitted to a corresponding port.

The control packet mentioned here indicates a packet used to control a network, such as the trap packet, the health packet, and the flush packet. The main signal mentioned here indicates a packet other than the control packets i.e. a packet that stores user data or so.

The main signal switch 330 is a processor that decides a port, to which the main signal received by the ports 311a to 311c and the port 312a is forwarded, by referring to address information stored in an address-information storing unit 361 of the address learning unit 360, and that outputs the main signal to the port that is decided as a destination.

The control packet processor 340 is a processor that processes the control packets, and includes a failure detector 341, a trap packet processor 342, a health packet processor 343, a health packet storing unit 344, and a flush packet processor 345. The failure detector 341 is a processor that monitors a state of link, detects a failure, and notifies the processors of the failure.

The trap packet processor 342 is a processor that generates a trap packet and handles a trap packet received. The trap packet mentioned here indicates a packet used to notify other data relay apparatuses that a failure occurs in a line or a data relay apparatus of the same ring.

When receiving the notification to the effect that the failure is detected in the port on the shared side from the failure detector 341, the trap packet processor 342 inquires the ring controller 350 as to which of the rings is the primary ring, and specifies the primary ring to generate a trap packet. When receiving the notification to the effect that the failure is detected in a port on the non-shared side, the trap packet processor 342 specifies the port where the failure is detected and generates a trap packet.

The process for receiving the trap packet is the same as that of Patent Literature 2. More specifically, if a data relay apparatus is the master of the ring where the trap packet is received, the relevant data relay apparatus causes the flush packet processor 345 to generate the flush packet, and then causes itself to move to the transit.

The health packet processor 343 is a processor that generates a health packet and handles a health packet received. The health packet mentioned here indicates a packet used to verify the connectivity of a ring. If there is a plurality of dummy masters or masters in the ring, the health packet is also used to select one out of these masters.

When the data relay apparatus of the health packet processor 343 is the master, the relevant health packet processor 343 specifies the relevant ring where the data relay apparatus is the master, and periodically generates a health packet. When the health packet transmitted does not return after a predetermined time passes, the health packet processor 343 causes the data relay apparatus to move to the dummy master.

When the data relay apparatus including the health packet processor 343 detects a failure and becomes the dummy master, the health packet processor 343 generates a health packet to select a master. The health packet processor 343 refers to priority information included in a health packet received from another data relay apparatus. If the priority of the data relay apparatus is higher than that of the another data relay apparatus, the health packet processor 343 causes the data relay apparatus to move to the master, or causes the data relay apparatus to move to the transit if the priority of the data relay apparatus is lower than that of the another data relay apparatus.

The health packet processor 343 performs the processes based on the technology of Patent Literature 2 and also processes of caching a health packet transmitted from another data relay apparatus and outputting a copy of the health packet cached as necessary. The processes are explained below with reference to FIG. 1. In the example shown in FIG. 1, the status 32 shows a case where the line of the data relay apparatus 300*d* as the master of the ring 1 and the line of the data relay apparatus 300*i* as the master of the ring 3 are blocked by the failure 32*a*, the timeout of the health packets thereby occurs, and the data relay apparatuses 300*d* and 300*i* move to the dummy masters, respectively.

Since it is assumed that all the data relay apparatuses in FIG. 1 are devices based on the technology of Patent Literature 2, the data relay apparatus 300*d* and the data relay apparatus 300*i* only move to the dummy masters, and therefore they maintain the block 31*a* and the block 31*c*, respectively. However, if the ring 2 and the ring 3 are structured with devices based on EAPS or devices based on the technology of Patent Literature 1, the data relay apparatus 300*d* and the data relay apparatus 300*i* move to the transit due to the timeout of the health packets, and release the block 31*a* and the block 31*c*, respectively, resulting in formation of the super ring.

In order to prevent the formation, the health packet processor 343 caches the health packets received by the data relay apparatus for each ring, in the health packet storing unit 344. If the data relay apparatus detects a failure in the shared portion and moves to the dummy master, the health packet processor 343 periodically transmits the copies of the health packets cached to the ring formed with the devices based on EAPS or based on the technology of Patent Literature 1. By transmitting the copies of the health packets in the above manner upon occurrence of the failure in the shared portion, the lines can be made to look like those that are not blocked by the failure, and formation of the super ring by the data relay apparatus 300*d* and the data relay apparatus 300*i* can be avoided.

In the explanation, the copies of the health packets are transmitted only to the ring structured with the devices based on EAPS or based on the technology of Patent Literature 1. However, the copies of the health packets may be transmitted to the ring structured with the devices based on the technology of Patent Literature 2. Furthermore, because the failure occurs in the shared portion, the control packet to instruct a data relay apparatus so as to prevent release of the block may be transmitted to the master of any ring other than the primary ring, instead of transmitting the copies of the health packets.

The flush packet processor 345 is a processor that generates a flush packet and handles a flush packet received. The flush packet mentioned here indicates a packet used to notify data relay apparatuses in the same ring so as to flush the address information learned and re-learn address information.

In the example shown in FIG. 1, the flush packet is generated when the master receives the trap packet, but when the data relay apparatus detects a failure and moves to the dummy master, the relevant data relay apparatus can generate a flush packet. In this case, if a location where the failure occurs is the shared portion, the data relay apparatus generates the flush packets not for all the rings, but the flush packet processor 345 inquires the ring controller 350 as to which of the rings is the primary ring, and generates the flush packet only for the primary ring. By doing so, the communication interruption upon re-learning of the address information can be restricted only to the primary ring.

In the failure recovery method according to the present embodiment, only the primary ring that needs to re-learn address information upon occurrence of a failure in the shared portion is as explained above.

The ring controller 350 controls statuses of rings, and includes a ring-status storing unit 351, a primary-ring selecting unit 352, and a block setting unit 353. The ring-status storing unit 351 stores information how normally the rings connected operate, and information based on which technology the ring is structured with data relay apparatuses. The ring-status storing unit 351 also stores a list of rings that can be selected as the primary ring. The primary-ring selecting unit 352 is a processor that selects a ring that becomes the primary ring based on the information stored in the ring-status storing unit 351.

Figure 4:
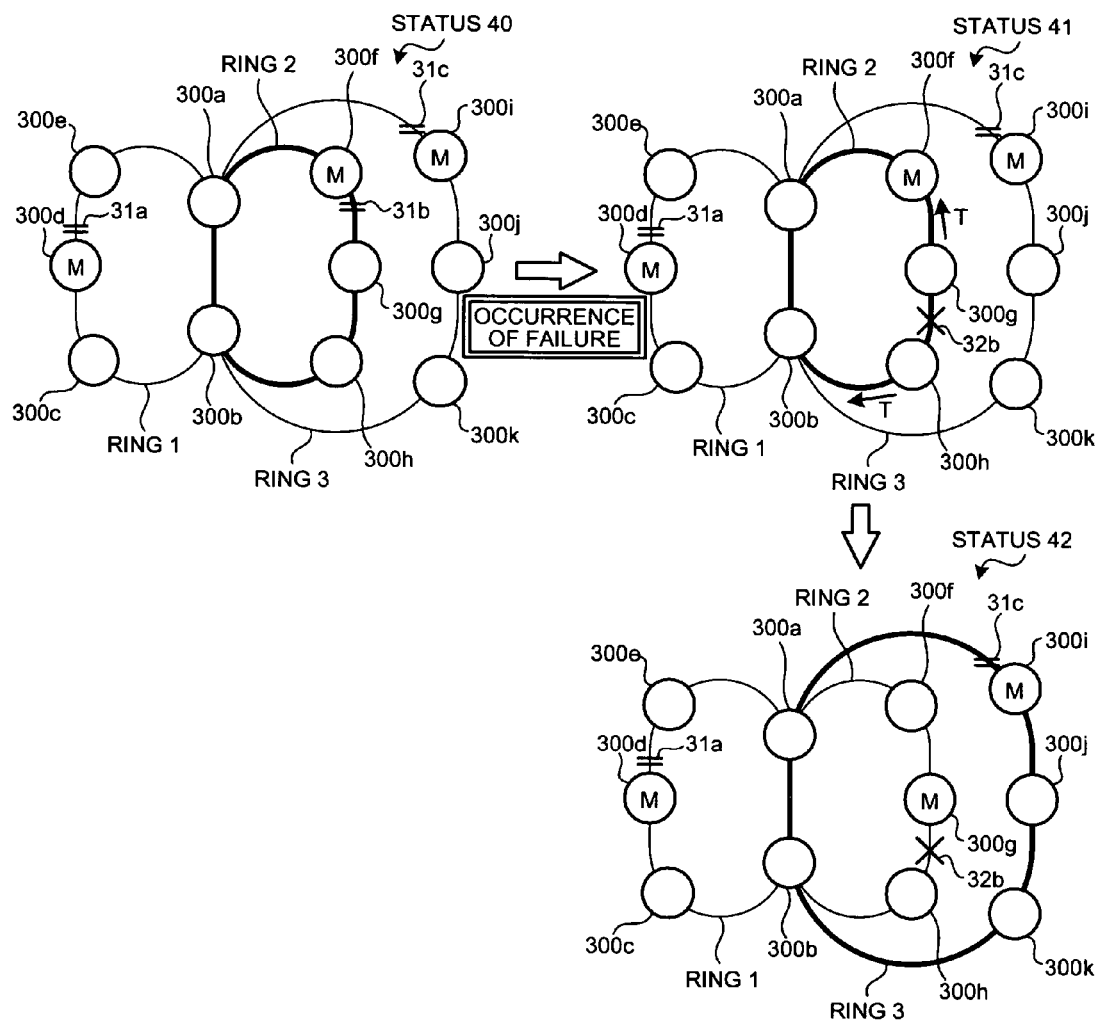
FIG. 4 is a schematic for explaining how to address a case where a failure occurs in a non-shared portion of a primary ring.

The primary ring is not fixed, and the primary-ring selecting unit 352 reselects a ring as the primary ring according to situations. Shifts of the primary ring are explained below using some examples. A case where a failure occurs in a non-shared portion of a primary ring is explained first. FIG. 4 is a schematic for explaining how to address a case where a failure occurs in a non-shared portion of a primary ring. The ring 2 is selected as an initial primary ring in the network having the same structure as that shown in FIG. 1 (status 40).

Assume that a failure 32*b* occurs in a portion between the data relay apparatus 300*g* and the data relay apparatus 300*h* that is a non-shared portion of the ring 2. The data relay apparatus 300*g* and the data relay apparatus 300*h* that detect the failure transmit trap packets to notify other data relay apparatus of occurrence of the failure (status 41).

If another failure occurs in the shared portion, the ring 2 as the primary ring is in the middle of handling the failure 32*b* and cannot provide redundancy. Therefore, the data relay apparatus 300*a* and the data relay apparatus 300*b* shift the primary ring to another ring when receiving the trap packets from the primary ring. In the example shown in FIG. 4, the data relay apparatus 300*a* and the data relay apparatus 300*b* receive the trap packets from the data relay apparatus 300*g* and the data relay apparatus 300*h* on the ring 2, and select the ring 3 as a new primary ring (status 42).

Figure 5:
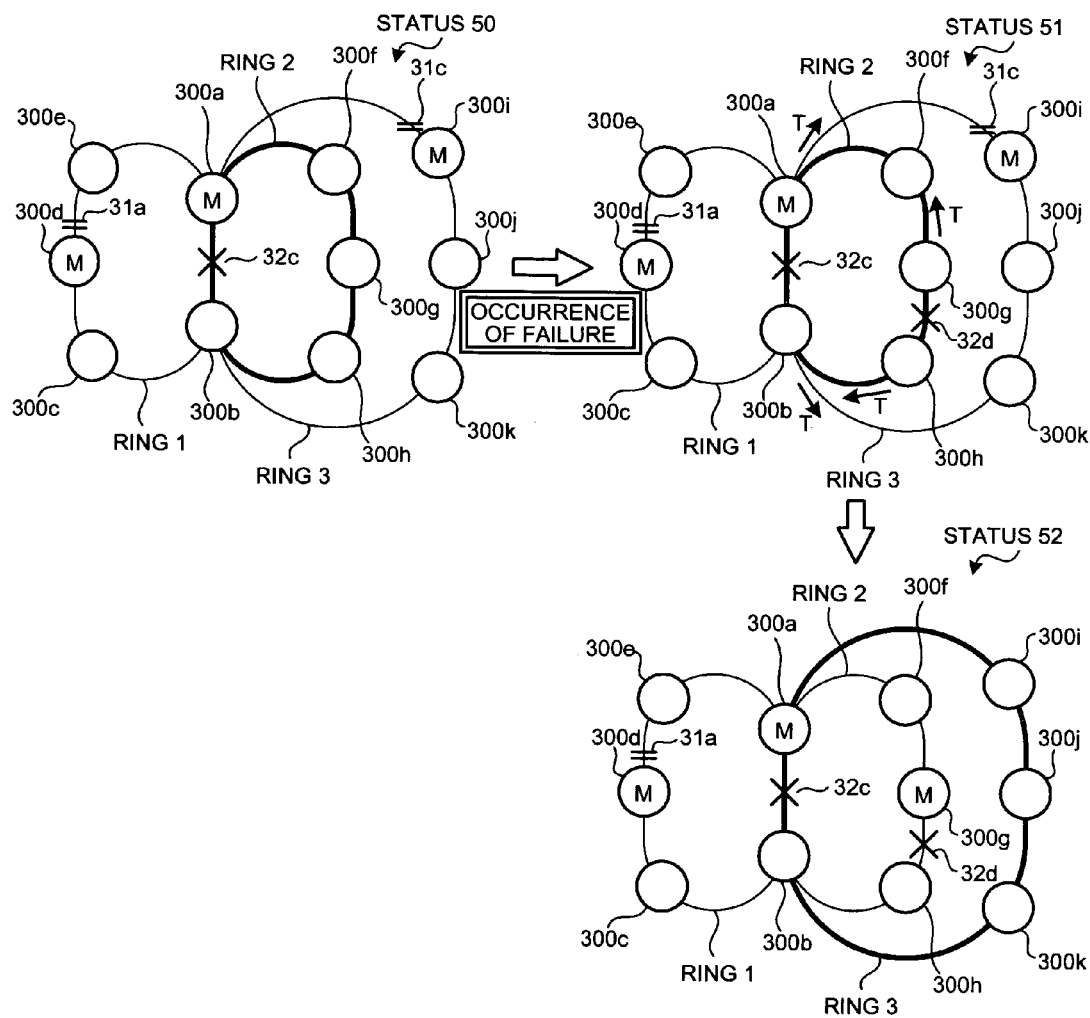
FIG. 5 is a schematic for explaining how to address a case where failures occur in a shared portion and a non-shared portion of the primary ring.

An example that failures occur in a shared portion and a non-shared portion of a primary ring is explained below. FIG. 5 is a schematic for explaining how to address a case where failures occur in the shared portion and the non-shared portion of the primary ring. A failure 32*c* occurs in a portion between the data relay apparatus 300*a* and the data relay apparatus 300*b* that is the shared portion in the network having the same structure as that shown in FIG. 1, and redundancy is provided by the ring 2 that is the primary ring (status 50).

Assume that a failure 32*d* occurs in a portion between the data relay apparatus 300*g* and the data relay apparatus 300*h* that is a non-shared portion of the ring 2. The ring 2 has already provided redundancy to response to the failure 32*c*, and therefore, the ring 2 cannot address the failure 32*d* if nothing is done.

Consequently, when receiving the trap packets from the primary ring in such a status that the redundancy is provided to the shared portion, the data relay apparatus 300*a* and the data relay apparatus 300*b* shift the primary ring to another ring (ring 3 in the example shown in FIG. 5) where no failure occurs. In order to cause the ring that is a new primary ring to provide the redundancy to the shared portion, the data relay apparatus 300*a* and the data relay apparatus 300*b* transmit the trap packets to the relevant ring (status 51).

As a result of the transmission, the failure 32*c* in the shared portion is handled by the ring 3 that is the new primary ring, and the failure 32*d* in the non-shared portion is handled by the ring 2 that is the initial primary ring. The two failures are thereby processed without any trouble (status 52).

Figure 6:
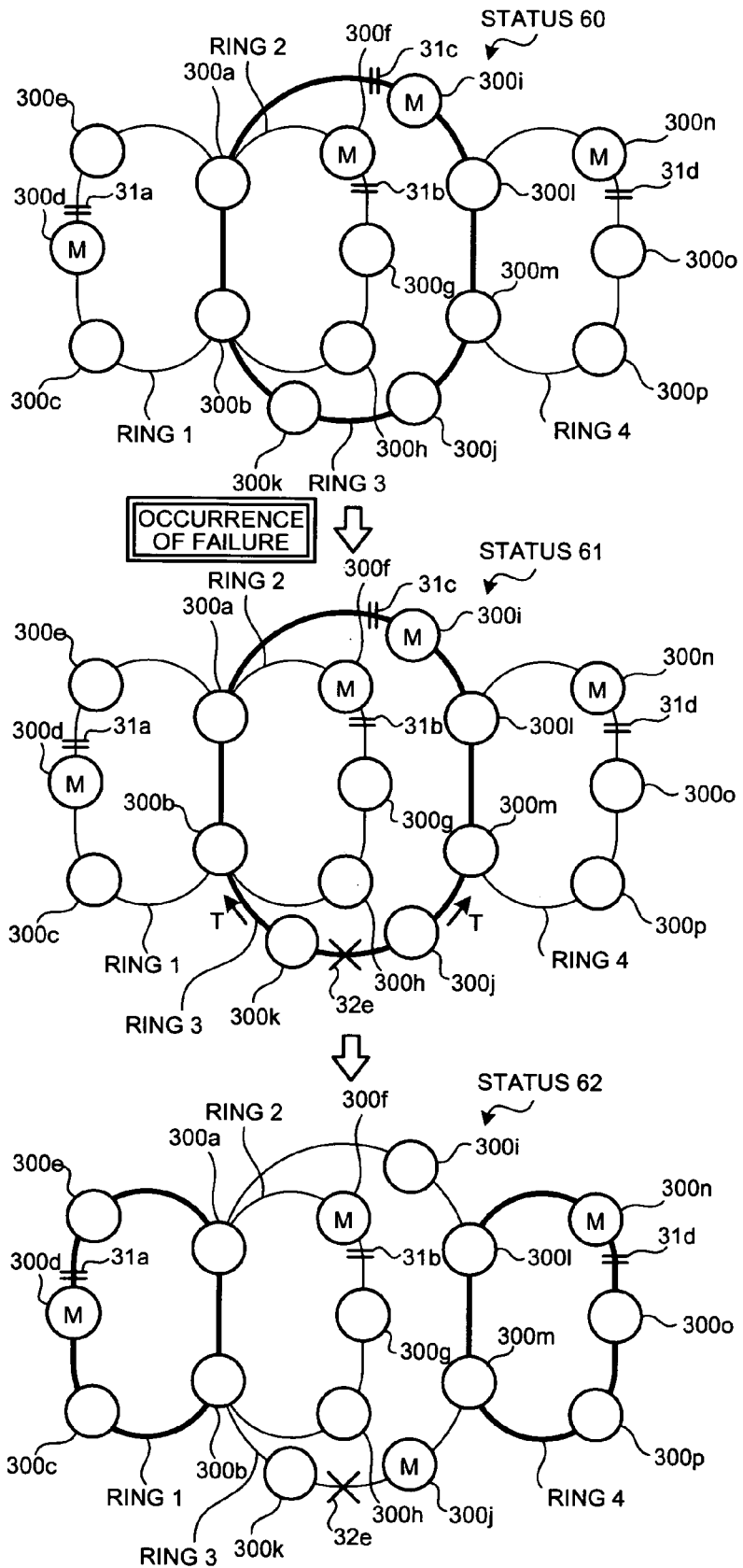
FIG. 6 is a schematic for explaining how to address a case where a plurality of shared portions is present in the primary ring.

An example that a plurality of shared portions is present in the primary ring is explained below. FIG. 6 is a schematic for explaining how to address a case where a plurality of shared portions is present in the primary ring. The network as shown in FIG. 6 is structured by adding a ring 4 to the network shown in FIG. 1. The ring 4 includes data relay apparatuses 300*l*, 300*m*, 300*n*, 300*o*, and 300*p*, and the data relay apparatuses 300*l* and 300*m* are shared by the ring 3.

The ring 3 is set to be the primary ring in two shared portions, i.e., the portion between the data relay apparatus 300*a* and the data relay apparatus 300*b* and a portion between the data relay apparatus 300*l* and the data relay apparatus 300*m* (status 60).

Assume that a failure 32*e* occurs in a portion between the data relay apparatus 300*j* and the data relay apparatus 300*k* that is a non-shared portion of the ring 3. The data relay apparatus 300*j* and the data relay apparatus 300*k* that detect the failure transmit trap packets to notify other data relay apparatus of occurrence of the failure (status 61).

At this time, if another failure occurs in either of the shared portions, the ring 3 as the primary ring is in the middle of handling the failure 32*e* and cannot provide redundancy. Therefore, the data relay apparatuses 300*a*, 300*b*, 300*l*, and 300*m* shift the primary ring to another ring when receiving the trap packets from the primary ring.

In the example shown in FIG. 6, the data relay apparatus 300*a* and the data relay apparatus 300*b* shift the primary ring to the ring 1, while the data relay apparatus 300*l* and the data relay apparatus 300*m* shift the primary ring to the ring 4 (status 62). Since the two rings that are new primary rings have no failure, each of the two rings can provide redundancy if a failure occurs in the shared portion.

Another case that the shared portions are present in the primary ring is explained below. The network shown in FIG. 7 has the same structure as that of the network shown in FIG. 6, and has two shared portions. More specifically, the ring 3 is the primary ring in both of the two shared portions that are the portion between the data relay apparatus 300*a* and the data relay apparatus 300*b* and the portion between the data relay apparatus 300*l* and the data relay apparatus 300*m* (status 70).

Assume that a failure 32*f* occurs in the portion between the data relay apparatus 300*a* and the data relay apparatus 300*b* that is the shared portion of the ring 3. The data relay apparatus 300*a* and the data relay apparatus 300*b* that detect the failure transmit trap packets to notify other data relay apparatus of occurrence of the failure (status 71).

At this time, if another failure occurs in the portion between the data relay apparatus 300*l* and the data relay apparatus 300*m* that is the other shared portion, the ring 3 as the primary ring is in the middle of handling the failure 32*f* and cannot provide redundancy to the portion between the data relay apparatus 300*l* and the data relay apparatus 300*m*. Therefore, the data relay apparatus 300*l* and the data relay apparatus 300*m* shift the primary ring to another ring when receiving the trap packets from the primary ring.

Figure 7:
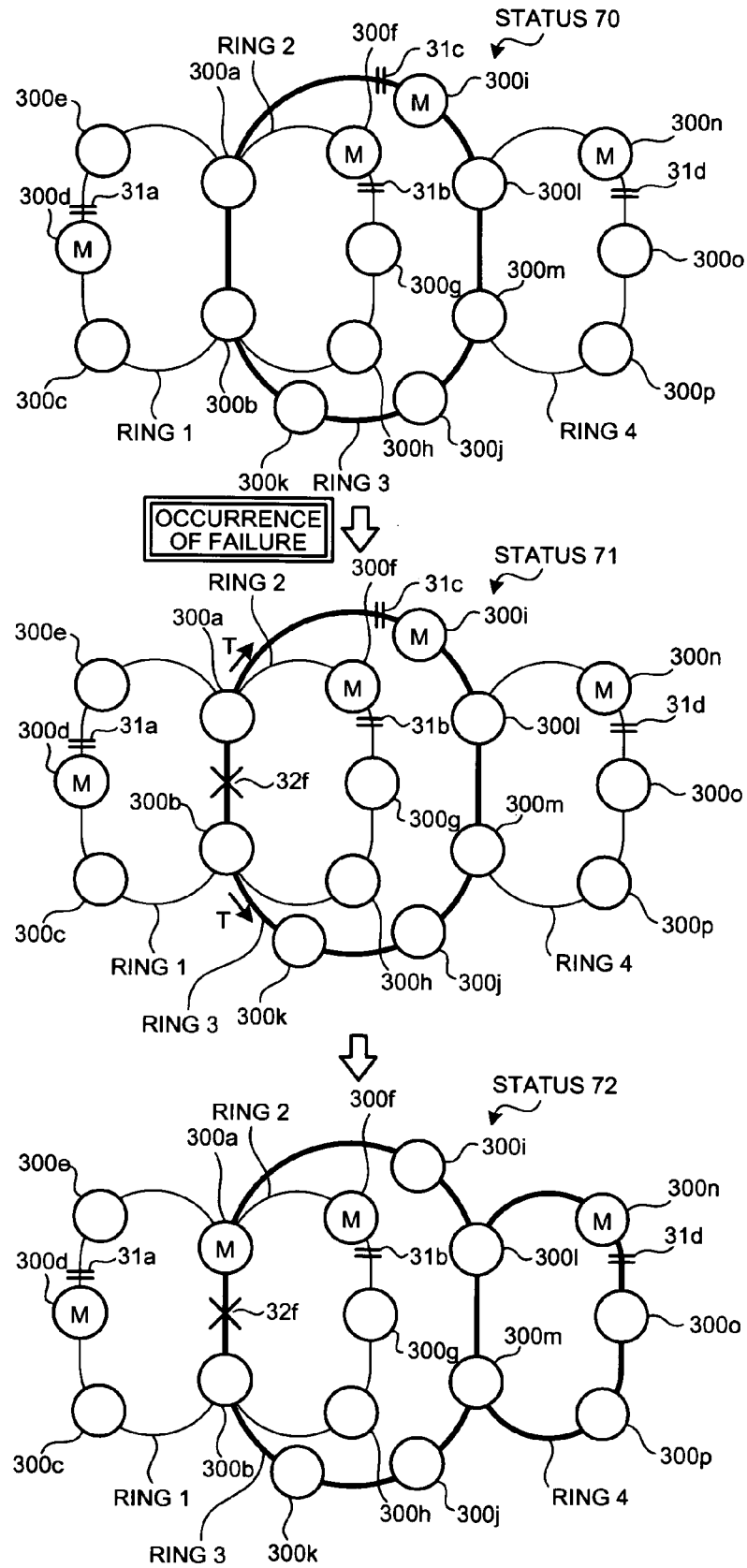
FIG. 7 is a schematic for explaining how to address another case where a plurality of shared portions is present in the primary ring.

In the example shown in FIG. 7, the data relay apparatus 300*l* and the data relay apparatus 300*m* have shifted the primary ring to the ring 4 (status 72). Since the ring 4 that is a new primary ring has no failure, the ring 4 can provide redundancy to the shared portion if the failure occurs in the shared portion.

Even if the primary ring has the shared portions in the above manner, it is possible to handle the failure in the shared portion by re-selecting the primary ring to another ring in response to reception of the trap packet from the ring that is the primary ring.

As explained above, any ring where a failure occurs is not targeted for selection of a primary ring by the primary-ring selecting unit 352. There is any ring that cannot be a target for selection of the primary ring. An example of this case is explained below.

Figure 8:
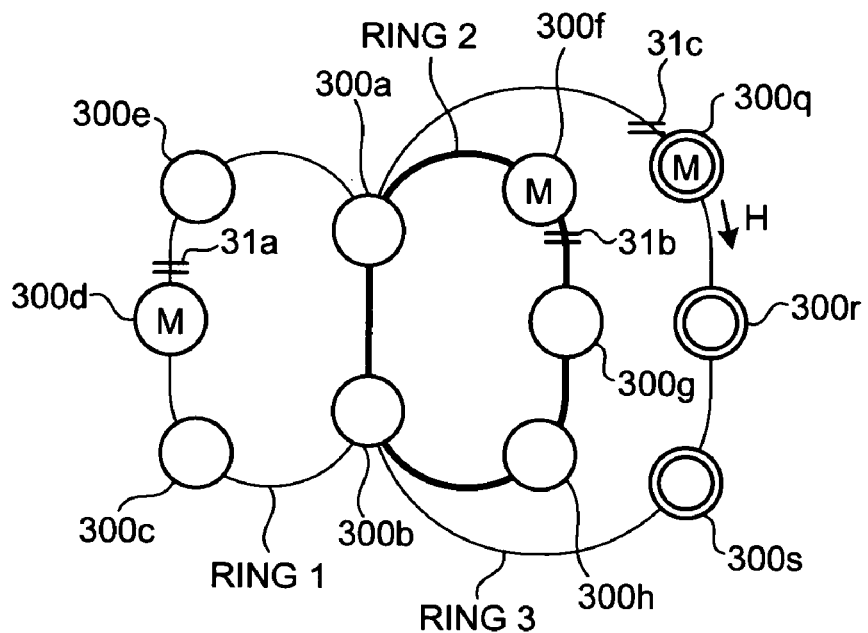
FIG. 8 is a schematic for explaining how to address a case where there is a ring based on EAPS.

FIG. 8 is a schematic for explaining how to address a case where there is a ring based on EAPS. The network shown in FIG. 8 has a multi-ring structure that shares the portion between the data relay apparatus 300*a* and the data relay apparatus 300*b* based on the ring 1 that includes the data relay apparatuses 300*a*, 300*b*, 300*c*, 300*d*, and 300*e*; the ring 2 that includes the data relay apparatuses 300*a*, 300*b*, 300*f*, 300*g*, and 300*h*; and a ring 3 that includes the data relay apparatuses 300*a*, 300*b* and data relay apparatuses 300*q*, 300*r*, and 300*s*.

Assume that the data relay apparatuses 300*q*, 300*r*, and 300*s* that form the ring 3 are data relay apparatuses based on EAPS. Because the data relay apparatuses based on EAPS have no function of re-selecting a master, the ring 3 cannot be changed to the primary ring. If there is a ring formed with data relay apparatuses based on EAPS in the ring having the shared portion, the ring is not a target for selection of the primary ring.

Figure 9:
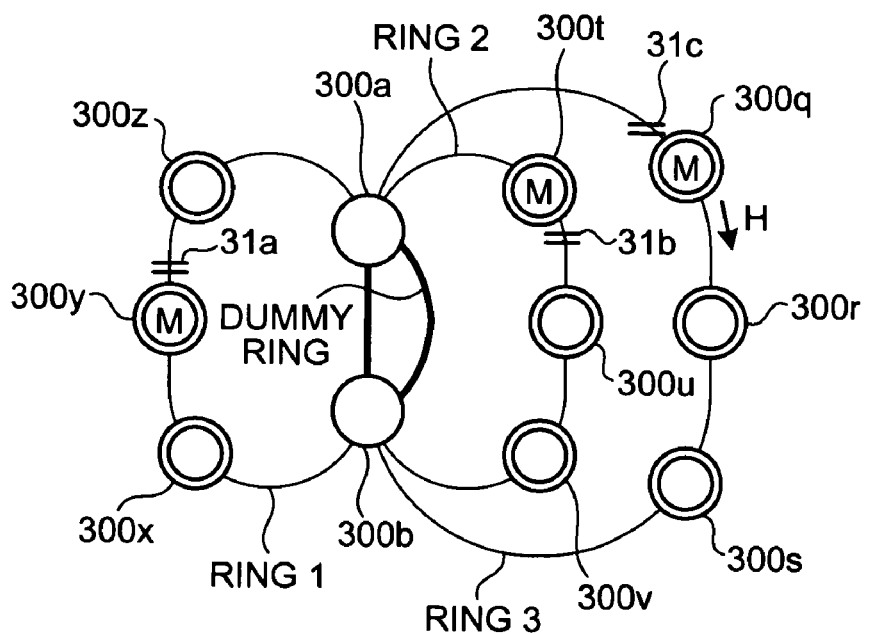
FIG. 9 is a schematic for explaining how to address a case where all the rings are based on EAPS.

It is considered here about a case where all the rings are formed with data relay apparatuses based on EAPS. FIG. 9 is a schematic for explaining how to address a case where all the rings are based on EAPS. The network shown in FIG. 9 is structured with three rings such as the rings 1 to 3. In the network, data relay apparatus other than the data relay apparatus 300*a* and the data relay apparatus 300*b* that are in the shared portion, are based on EAPS. The data relay apparatuses includes data relay apparatuses 300*t*, 300*u*, 300*v*, 300×, 300*y*, 300*z*, and the data relay apparatuses 300*q*, 300*r*, and 300*s*.

If all the rings that are based on EAPS, none of the rings 1 to 3 becomes a target for selection of the primary ring. In such a network as above, however, another line is used to connect between the data relay apparatus 300*a* and the data relay apparatus 300*b* to structure a dummy ring that includes only the data relay apparatus 300*a* and the data relay apparatus 300*b*. This allows provision of redundancy to the shared portion.

Referring back to FIG. 3, the block setting unit 353 is a processor that instructs the main signal switch 330 and the control packet processor 340 so as to set blocks for blocking a packet. More specifically, if a failure is detected in the non-shared portion, the block setting unit 353 issues an instruction to both the main signal switch 330 and the control packet processor 340 so as to block the packet of a port where the failure is detected. If a failure is detected in the shared portion, the block setting unit 353 issues an instruction only to the main signal switch 330 so as to block the packet of a port where the failure is detected and cause a control packet to pass through the port.

The address learning unit 360 is a processor that learns address information for control paths, and includes the address-information storing unit 361 and an address-information updating unit 362. The address-information storing unit 361 is a storage that stores a pair of a port through which a packet is received and a source Media Access Control (MAC) address that is set in the packet, as address information.

Figure 10:
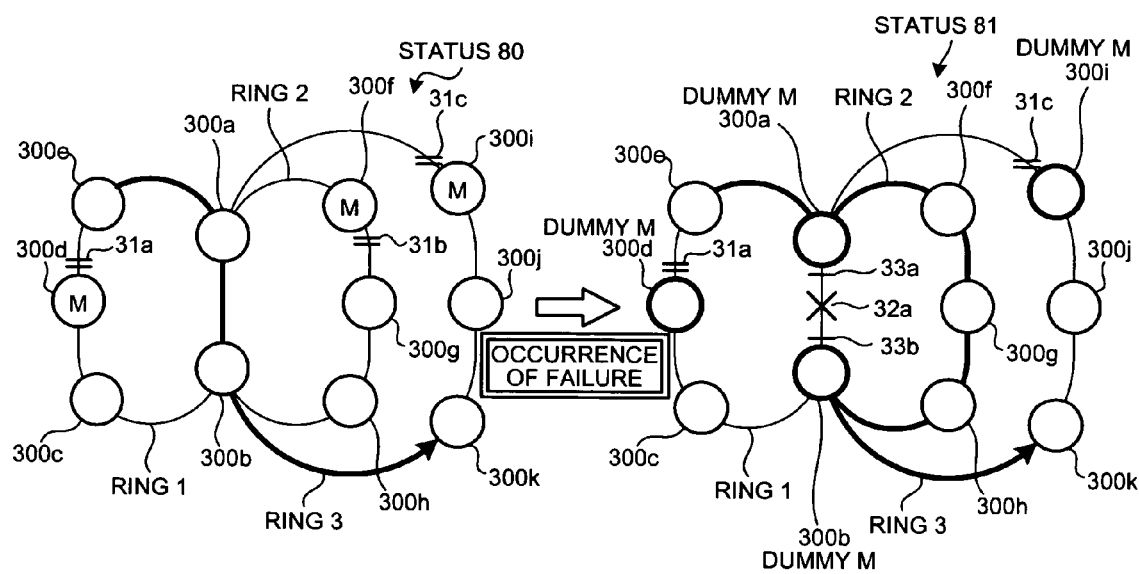
FIG. 10 is a schematic for explaining how to update address information.

The address-information updating unit 362 is a processor that updates address information in order to complete re-learning of address information in a short time. An example of updating address information is explained below. FIG. 10 is a schematic for explaining how to update address information.

If a packet is transmitted from the data relay apparatus 300e to the data relay apparatus 300k in the status 30 shown in FIG. 1, then the packet is transmitted through the data relay apparatuses 300e, 300a, 300b, and 300k (status 80). If a packet is transmitted from the data relay apparatus 300e to the data relay apparatus 300k in the status 30 after the failure 32a occurs in the shared portion, then the packet is transmitted through the data relay apparatuses 300e, 300a, 300f, 300g, 300h, 300b, and 300k (status 81).

In other words, before the failure 32a occurs, the packet is transmitted from the data relay apparatus 300a to the data relay apparatus 300k through the shared portion, while after the failure 32a occurs, the packet is transmitted from the data relay apparatus 300a to the data relay apparatus 300k through the ring 2 by going round the shared portion.

Referring to address information used when the data relay apparatus 300a decides a destination of a packet, address information before the failure 32a occurs is changed to another address information after the failure 32a occurs. More specifically, the address information indicates that a packet having a MAC address of A as a destination address is to be forwarded to a port connected to the shared portion, and the another address information indicates that the packet having the MAC address of A as a destination address is to be forwarded to a port connected to the ring 2.

The address information for the data relay apparatus 300a is supposed to be changed in the above manner before and after the failure 32a occurs. That is, the address information indicating that the packet is forwarded to the port connected to the shared portion is supposed to be changed only to the address information indicating that the packet is forwarded to the port connected to the primary ring. The address-information updating unit 362 uses this principle and updates address information, when a failure occurs in the shared portion, so that the address information indicating that the packet is forwarded to the port connected to the shared portion is changed to the address information indicating that the packet is forwarded to the port connected to the primary ring. This update allows the time required for re-learning the address information to be reduced.

More specifically, in the status 30 shown in FIG. 1, the data relay apparatus 300a receives the flush packet and is instructed so as to re-learn address information. The address-information updating unit 362 does not re-learn address information and updates so that the address information indicating that the packet is forwarded to the port connected to the data relay apparatus 300b is changed to the address information indicating that the packet is forwarded to the port connected to the data relay apparatus 300f. This process requires only updating of information stored in the address-information storing unit 361. Therefore, the process is completed in a very short time, and a period when communication interruption occurs is extremely reduced.

Figure 11:
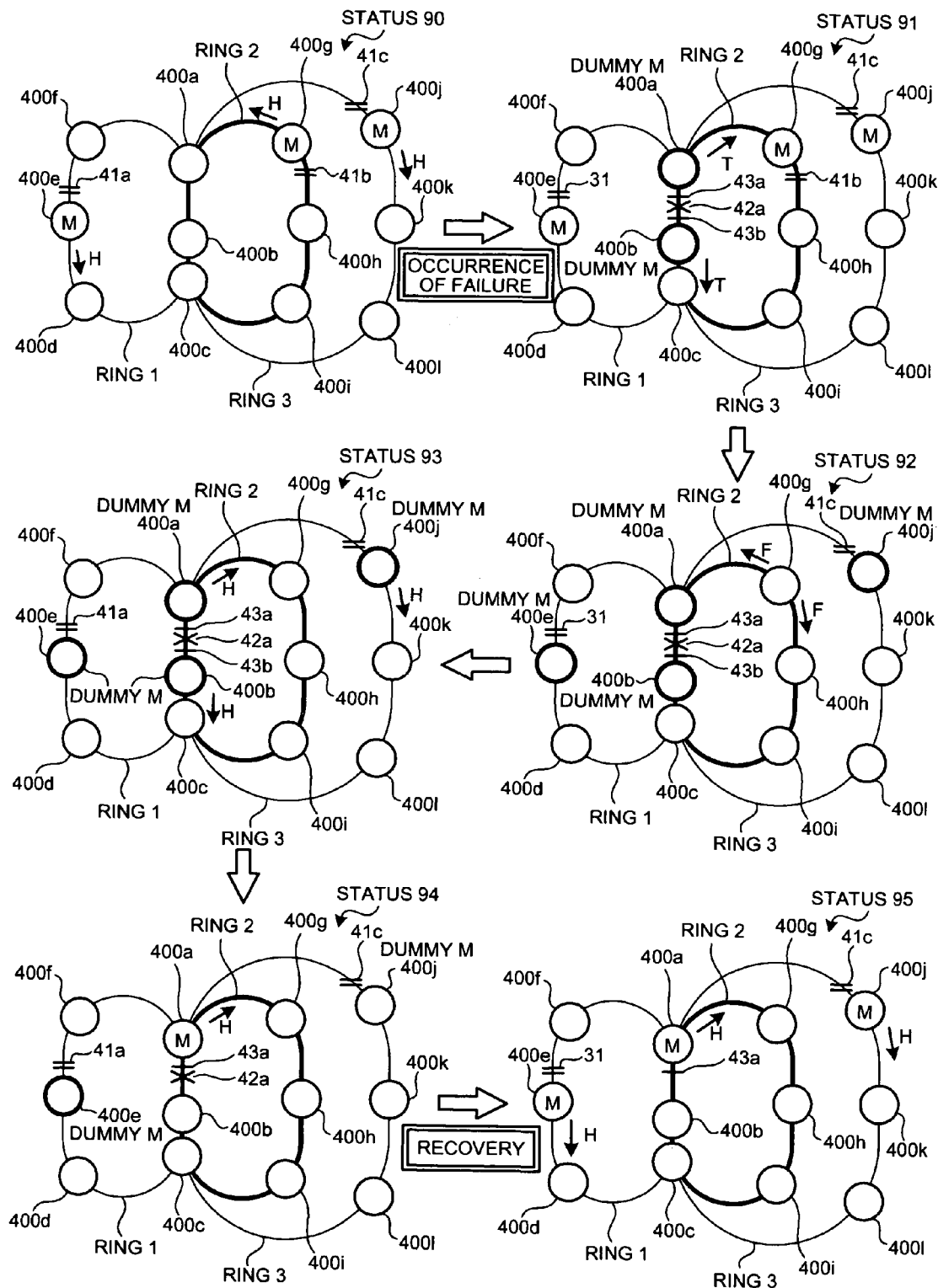
FIG. 11 is a schematic for explaining failure recovery operation when three or more data relay apparatuses are provided in the shared portion.

The explanation is provided so far based on the case where two data relay apparatuses are present in the shared portion. However, even if three or more data relay apparatuses are provided in the shared portion, the failure recovery method according to the present embodiment is useful. FIG. 11 is a schematic for explaining a failure recovery operation when three or more data relay apparatuses are provided in the shared portion.

The network shown in FIG. 11 has a multi-ring structure that shares a portion including three data relay apparatuses 400a, 400b, and 400c based on a ring 1 that includes the data relay apparatuses 400a, 400b, and 400c and data relay apparatuses 400d, 400e, and 400f; a ring 2 that includes the data relay apparatuses 400a, 400b, and 400c and data relay apparatuses 400g, 400h, and 400i; and a ring 3 that includes the data relay apparatuses 400a, 400b, and 400c and data relay apparatuses 400j, 400k, and 400l.

The data relay apparatuses 400a, 400b, and 400c situated in a shared portion are data relay apparatuses that execute the failure recovery method according to the present embodiment of the present invention. The other data relay apparatuses are ones that perform failure recovery based on the technology of Patent Literature 2.

In normal operation, the data relay apparatus 400e that is a master of the ring 1 sets a block 41a in a port thereof on the side of the data relay apparatus 400f, and causes a health packet to go around from a port on the opposite side to verify the connectivity of the ring. Likewise, the data relay apparatus 400g that is a master of the ring 2 sets a block 41b in a port thereof on the side of the data relay apparatus 400h, and causes a health packet to go around from a port on the opposite side to verify the connectivity of the ring. Likewise, the data relay apparatus 400j that is a master of the ring 3 sets a block 41c in a port thereof on the side of the data relay apparatus 400a, and causes a health packet to go around from a port on the opposite side to verify the connectivity of the ring (status 90).

Assume that a failure 42a occurs in a portion between the data relay apparatus 400a and data relay apparatus 400b that is a shared portion. The data relay apparatus 400a detects the failure 42a and determines whether the failure occurs in the shared portion. If it is determined that the failure occurs in the shared portion, the data relay apparatus 400a sets a block 43a in a port on the side of the shared portion and transmits a trap packet only from a port, out of ports on the opposite side to the shared portion, connected to the ring 2 that is a primary ring. Likewise, the data relay apparatus 400b also sets a block 43b in a port on the side of the shared portion, specifies the ring 2, and transmits a trap packet from the port on the opposite side to the shared portion. The block 43a and the block 43b, which are set in the shared portion, block a user data packet but allow a control packet such as a health packet to pass through the ports.

The data relay apparatus 400a and the data relay apparatus 400b move to dummy masters after transmission of the trap packets. The movement of the data relay apparatus that detects a failure to the dummy master after the transmission of the trap packet thereby is normal operation when the failure recovery is performed based on the technology of Patent Literature 2 (status 91).

When receiving the trap packet, the data relay apparatus 400g that is the master of the ring 2 releases the block 41b to recover the failure, and then moves to the transit. The movement of the master to the transit when receiving the trap packet is normal operation when the failure recovery is performed based on the technology of Patent Literature 2.

The release of the block 41b causes a communication path to be changed. Therefore, the data relay apparatus 400g transmits flush packets to the data relay apparatuses in the ring, instructing them to flush address information learned. The transmission of the flush packet may be performed by the data relay apparatus 400a and the data relay apparatus 400b that have moved to the dummy masters (status 92).

Referring to the ring 1 and the ring 3, the health packets are blocked by the failure 42a to be prevented from going around. Therefore, the data relay apparatus 400e that is the master of the ring 1 and the data relay apparatus 400j that is the master of the ring 3 move to dummy masters according to the transition defined by the technology of Patent Literature 2. The user data packet cannot pass through a portion between the data relay apparatus 400a and the data relay apparatus 400b, but goes along the ring 2 to keep their connectivity. Therefore, the communication paths in the ring 1 and the ring 3 are not actually changed, which causes transmission of the flush packet to be eliminated in the ring 1 and the ring 3 (status 93).

Thereafter, in order to decide which of the data relay apparatus 400a and the data relay apparatus 400b becomes the master, both of them transmit health packets to each other and compare their priorities with each other as described in Patent Literature 2.

In this example, as a result of exchanging the health packets, the data relay apparatus 400a moves to the master, and the data relay apparatus 400b moves to the transit. In the overall network, because the block 41a is maintained in the ring 1 and the block 41c is maintained in the ring 3, the super loop is not formed. Moreover, the block 41b is released, and therefore, the ring 2 can be used as an alternative to the portion between the data relay apparatus 400a and the data relay apparatus 400b where the failure occurs (status 94).

When the failure is recovered, the health packets transmitted by the data relay apparatus 400e and the data relay apparatus 400j go around along the rings, and the data relay apparatus 400e and the data relay apparatus 400j return to the masters according to the transition defined by the technology of Patent Literature 2. Although the block 43a is present between the data relay apparatus 400a and the data relay apparatus 400b, the block 43a does not block the control packet but allows the control packet to pass through the port. The blocks do not move upon recovery, and therefore, there is no need to re-learn the address information (status 95).

Even if three or more data relay apparatuses are provided in the shared portion, the failure recovery method according to the present embodiment effectively functions. Furthermore, in order to prevent formation of a super loop, there is no need to allocate the roles such as the controller and the partner to the data relay apparatuses in the shared portion, and the communication interruption due to re-learning of address information occurs only once in the primary ring.

Figure 12:
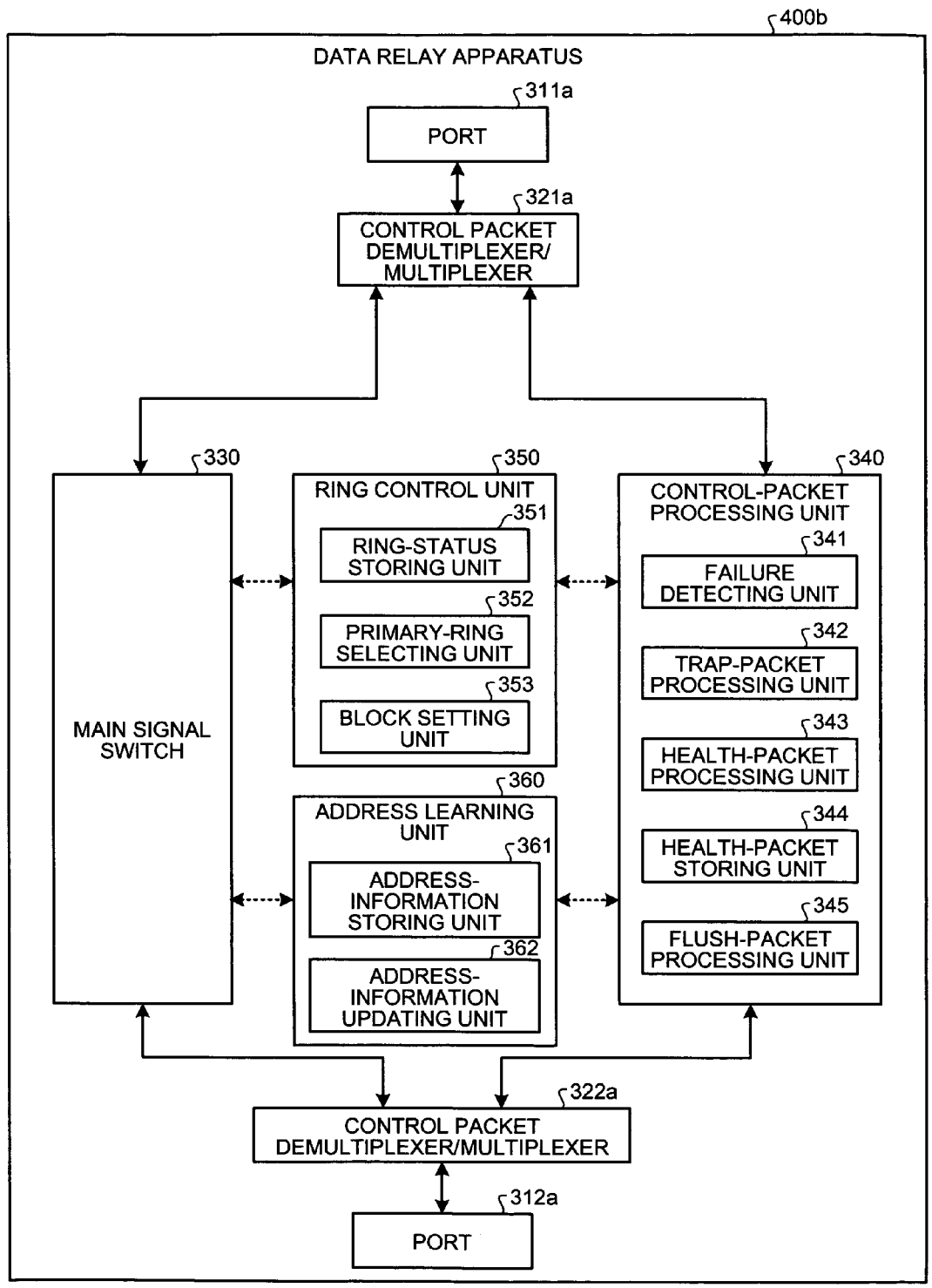
FIG. 12 is a block diagram of a configuration of a data relay apparatus shown in FIG. 11.

A configuration of the data relay apparatus 400b situated in the middle of the shared portion is explained below. FIG. 12 is a block diagram of the configuration of the data relay apparatus 400b shown in FIG. 11. The configuration of the data relay apparatus 400b is identical to the data relay apparatus 300a shown in FIG. 3 except that the data relay apparatus 400b has only a pair of a port and a control packet demultiplexer/multiplexer unlike the data relay apparatus 300a that has three pairs thereof corresponding to the rings 1 to 3.

Process procedures for the data relay apparatus that implements the failure recovery method according to the present embodiment are explained below. Herein, only some of the process procedures specific to the failure recovery method according to the present embodiment are explained, and the process procedures described in Patent Literature 1 and Patent Literature 2 are omitted.

Figure 13:
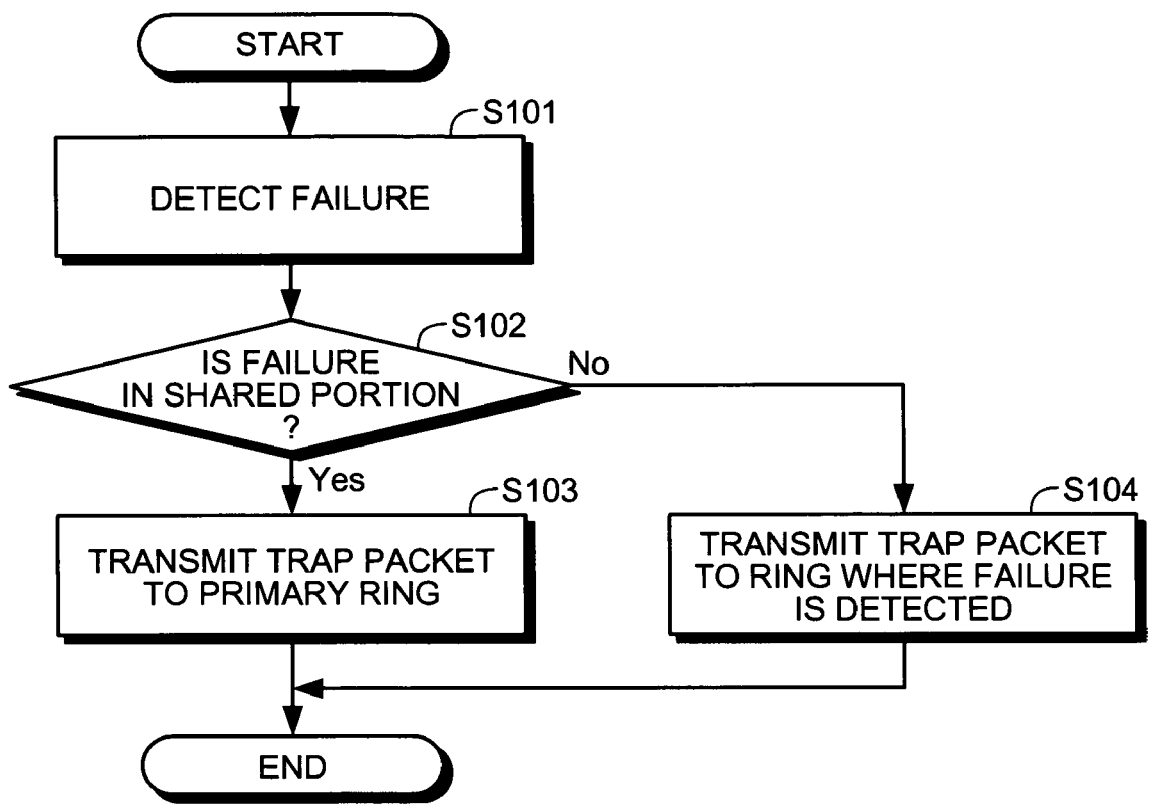
FIG. 13 is a flowchart of process procedures for a case where a failure is detected.

FIG. 13 is a flowchart of process procedures for a case where a failure is detected. If a failure is detected in a network (step S101), it is checked whether a location where the failure occurs is the shared portion (step S102).

If the failure occurs in the shared portion (step S102, Yes), a trap packet is transmitted to the primary ring (step S103). If the failure occurs not in the shared portion (step S102, No), the trap packet is transmitted to a ring where the failure is detected (step S104).

Figure 14:
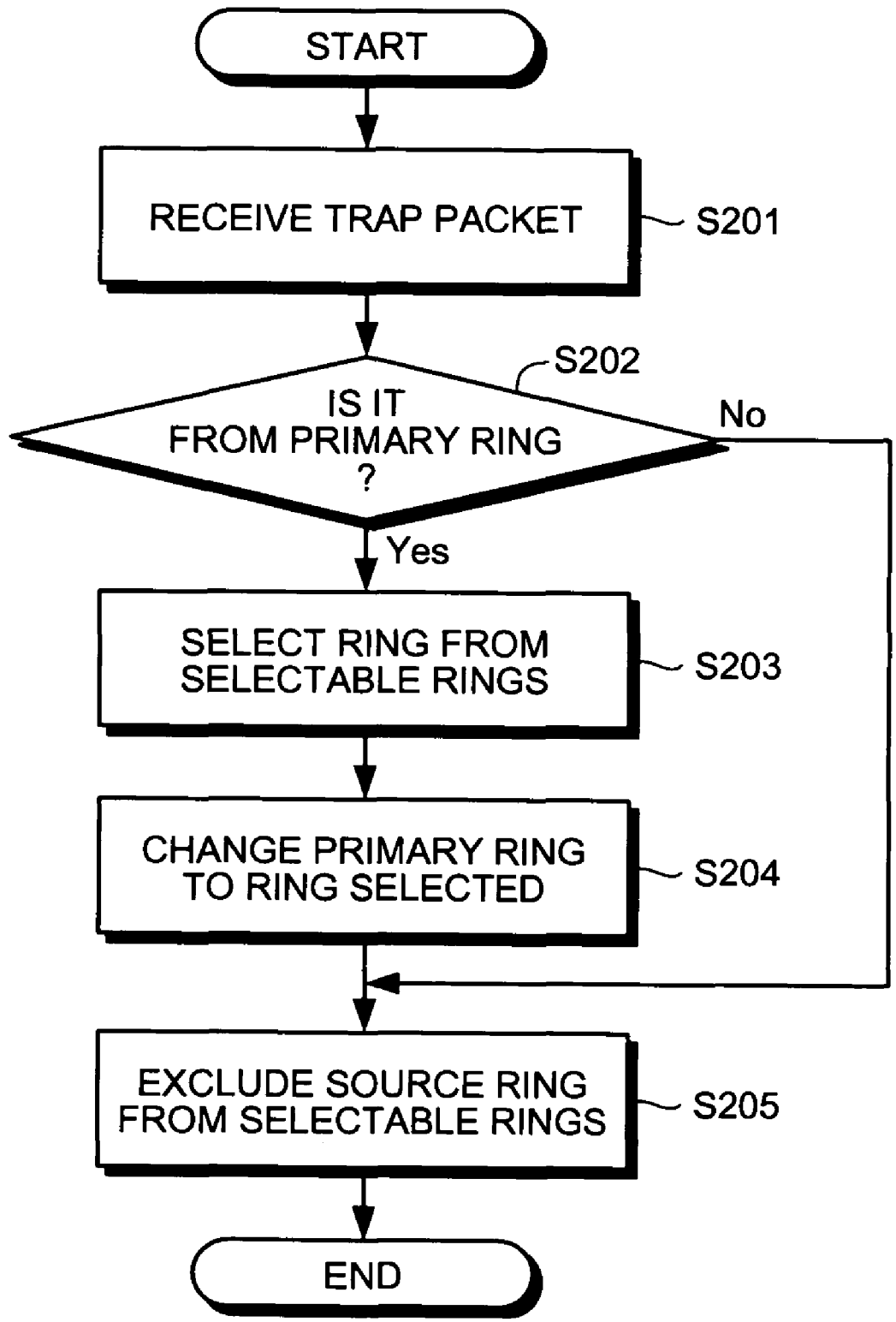
FIG. 14 is a flowchart of process procedures for a case where a trap packet is received.

FIG. 14 is a flowchart of process procedures for a case where the trap packet is received. If the trap packet is received (step S201), it is checked whether the trap packet is transmitted from the primary ring (step S202).

If the trap packet is received from the primary ring (step S202, Yes), a new ring is selected from a list of rings that are stored in the ring-status storing unit 351 and that are selectable as a primary ring (step S203), and the primary ring is changed to the ring selected (step S204).

The ring as a source of the trap packet is excluded from the list of the rings irrespective of whether the trap packet is transmitted from the primary ring (step S205).

Figure 15:
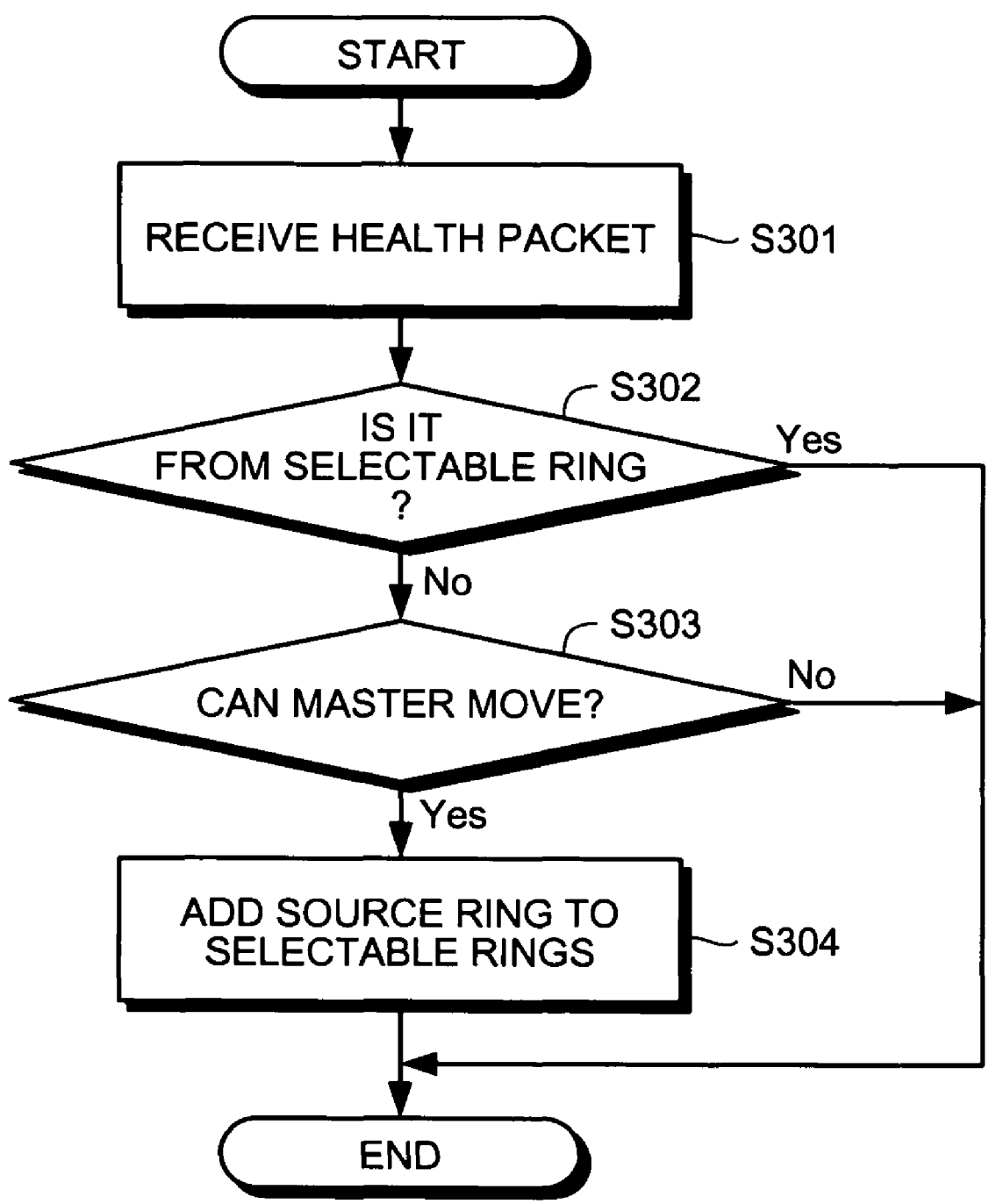
FIG. 15 is a flowchart of process procedures for a case where a health packet is received.

FIG. 15 is a flowchart of process procedures for a case where a health packet is received. If a health packet is received (step S301), it is checked whether the health packet is transmitted from a ring that is selectable (step S302).

If the ring as a source of the health packet is not included in the list of the rings (step S302, No) and the ring is a ring in which the master can move, i.e., a ring that includes data relay apparatuses based on the technology of Patent Literature 1 or the technology of Patent Literature 2 (step S303, Yes), then the ring as the source is added to the list of the rings (step S304).

In the present embodiment, as explained above, when a failure occurs in the shared portion, the trap packet is transmitted only to a preset primary ring, thus, avoiding formation of a super loop without allocating the roles such as the controller and the partner to the data relay apparatuses.

Furthermore, even if the flush packet instructing a data relay apparatus to flush address information for path control is transmitted in response to reception of the trap packet, a range affected thereby is restricted to the primary ring, which allows suppression of communication interruption due to re-learning of the address information to a minimum.

According to one aspect of the present invention, when a failure occurs in the shared portion, the failure notification packet is transmitted only to one redundancy-providing ring which is preset and provides redundancy. Therefore, it is possible to avoid formation of a super loop without allocating the roles such as the controller and the partner to the data relay apparatuses.

With this configuration, even if the flush request packet instructing a data relay apparatus to flush address information for path control is transmitted in response to reception of the failure notification packet, a range affected thereby is restricted to the redundancy-providing ring. Thus, it is possible to suppress the communication interruption due to re-learning of the address information to a minimum.

Furthermore, when a failure occurs in the shared portion, a hello packet previously stored is periodically transmitted. Thus, it is possible to avoid formation of the super loop due to release of the block when a timeout of the hello packet occurs.

Moreover, when a failure occurs in the shared portion, a packet is transmitted to instruct a ring other than the redundancy-providing ring so as not to release the block. Thus, it is possible to avoid formation of the super loop due to release of the block when a timeout of the hello packet occurs.

Furthermore, when the address information for path control needs to be flushed in accordance with occurrence of the failure in the shared portion, a flush request packet is transmitted only to the redundancy-providing ring. Thus, it is possible to suppress the communication interruption due to re-learning of the address information to a minimum.

Moreover, when the address information for path control needs to be re-learned in accordance with occurrence of the failure in the shared portion, by updating existing address information instead of re-leaning it from the beginning, the same effect can be obtained. Thus, it is possible to suppress the time of communication interruption due to re-learning of the address information to a minimum.

Furthermore, when a failure occurs in the redundancy-providing ring, another ring is set as a new redundancy-providing ring. Thus, it is possible to reliably recover the failure in the shared portion even if a failure occurs in a non-shared portion.

Moreover, a ring where a failure occurs is excluded from selection candidates for the redundancy-providing ring. Thus, it is possible to recover the failure by a ring that can surely provide redundancy when a failure occurs in a shared portion.

Furthermore, a ring is checked that no failure occurs therein by receiving the hello packet, and then the ring is added to selection candidates for the redundancy-providing ring. Thus, it is possible to recover the failure by a ring that can surely provide redundancy when a failure occurs in a shared portion.

Moreover, a ring that is controlled by a different failure recovery method is excluded from selection candidates for the redundancy-providing ring. Thus, it is possible to recover the failure in a network where rings are controlled by different failure recovery methods.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data relay apparatus that recovers a failure in a network having a shared portion that is shared by a plurality of rings, relays a packet in the shared portion, and avoids occurrence of a loop path by setting at a portion other than the shared portion on each of the rings a block that blocks the packet and passes through a control packet used to control the network, the data relay apparatus comprising:
   a failure detecting unit to detect a failure in the network;
   a ring selecting unit to select from the rings a ring in which a failure is not detected by the failure detecting unit as a redundancy-providing ring used to provide redundancy for the shared portion;
   a transmitting unit to transmit, to only a data relay apparatus on the redundancy-providing ring selected from among a plurality of data relay apparatuses on the rings that relay the packet in the portion other than the shared portion on each of the rings, a trap packet that makes each of the data relay apparatuses release the block as the control packet, when the failure detecting unit detects a failure in the shared portion;
   a block setting unit to set the block at a port connected to the shared portion, wherein
   the ring selecting unit selects the redundancy-providing ring from the rings other than a ring whose portion except for the shared portion includes a failure detected by the failure detecting unit.

2. The data relay apparatus according to claim 1, further comprising:
   a hello-packet storing unit to store a hello packet received; and
   a hello-packet transmitting unit to transmit, when the failure is detected by the failure detecting unit, the hello packet stored in the hello-packet storing unit at a predetermined interval.

3. The data relay apparatus according to claim 1, further comprising a control-packet transmitting unit to transit, when the failure is detected by the failure detecting unit, the control packet to a data relay apparatus that sets the block in a ring other than the redundancy-providing ring selected so as not to release the block.

4. The data relay apparatus according to claim 1, further comprising a flush-request-packet transmitting unit to transmit, when the failure is detected by the failure detecting unit, a flush request packet to the redundancy-providing ring selected to flush address information for path control.

5. The data relay apparatus according to claim 1, further comprising an address-information updating unit to update, when the failure is detected by the failure detecting unit and when address information for path control needs to be updated, the address information, so that a packet that is supposed to be output to the port where the failure is detected by the failure detecting unit is output to a port connected to the redundancy-providing ring selected.

6. The data relay apparatus according to claim 1, wherein the redundancy-providing-ring selecting unit selects, when the redundancy-providing ring selected receives a failure notification packet, another ring that shares the shared portion as a new redundancy-providing ring.

7. The data relay apparatus according to claim 6, wherein when a ring other than the redundancy-providing ring selected receives the failure notification packet, the redundancy-providing ring selecting unit excludes the ring from selection candidates for the redundancy-providing ring.

8. The data relay apparatus according to claim 6, wherein when a ring other than the redundancy-providing ring selected receives the hello packet, the redundancy-providing ring selecting unit adds the ring to selection candidates for the redundancy-providing ring.

9. The data relay apparatus according to claim 6, wherein the redundancy-providing ring selecting unit excludes a ring that shares the shared portion but is controlled by a different failure recovery method from selection candidates for the redundancy-providing ring.

10. A failure recovery method for a data relay apparatus that recovers a failure in a network having a shared portion that is shared by a plurality of rings, relays a packet in the shared portion, and avoids occurrence of a loop path by setting at a portion other than the shared portion on each of the rings a block that blocks the packet and passes through a control packet used to control the network, the method comprising:
   detecting a failure in the network;
   selecting from the rings a ring in which a failure is not detected at the detecting as a redundancy-providing ring used to provide redundancy for the shared portion;
   transmitting, to only a data relay apparatus on the redundancy-providing ring selected from among a plurality of data relay apparatuses on the rings that relay the packet in the portion other than the shared portion on each of the rings, a trap packet that causes each of the data relay apparatuses to release the block as the control packet, when the detecting detects a failure in the shared portion; and
   setting the block at a port connected to the shared portion, wherein
   the selecting includes selecting the redundancy-providing ring from the rings other than a ring whose portion except for the shared portion includes a failure detected at the detecting.

11. The failure recovery method according to claim 10, further comprising:
storing a hello packet received; and
transmitting, when the failure is detected at the detecting, the hello packet stored at the storing at a predetermined interval.

12. The failure recovery method according to claim 10, wherein the transmitting includes transmitting, when the failure is detected at the detecting, the control packet to a data relay apparatus that sets the block in a ring other than the redundancy-providing ring selected so as not to release the block.

13. The failure recovery method according to claim 10, further comprising transmitting, when the failure is detected at the detecting, a flush request packet to the redundancy-providing ring selected to flush address information for path control.

14. The failure recovery method according to claim 10, further comprising updating, when the failure is detected at the detecting and when address information for path control needs to be updated, the address information, so that a packet that is supposed to be output to the port where the failure is detected at the detecting is output to a port connected to the redundancy-providing ring selected.

15. The failure recovery method according to claim 10, wherein the selecting includes selecting, when the redundancy-providing ring selected receives a failure notification packet, another ring that shares the shared portion as a new redundancy-providing ring.

16. The failure recovery method according to claim 15, wherein when a ring other than the redundancy-providing ring selected receives the failure notification packet, the selecting includes excluding the ring from selection candidates for the redundancy-providing ring.

17. The failure recovery method according to claim 15, wherein when a ring other than the redundancy-providing ring selected receives the hello packet, the selecting includes adding the ring to selection candidates for the redundancy-providing ring.

18. The failure recovery method according to claim 15, wherein the selecting includes excluding a ring that shares the shared portion but is controlled by a different failure recovery method from selection candidates for the redundancy-providing ring.

* * * * *